United States Patent
Ko et al.

(10) Patent No.: US 10,609,735 B2
(45) Date of Patent: Mar. 31, 2020

(54) METHOD OF TRANSMITTING AND RECEIVING PHYSICAL RANDOM ACCESS CHANNEL AND DEVICE THEREFOR

(71) Applicant: LG Electronics Inc., Seoul (KR)

(72) Inventors: Hyunsoo Ko, Seoul (KR); Kijun Kim, Seoul (KR); Eunsun Kim, Seoul (KR); Sukhyon Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/318,060

(22) PCT Filed: Nov. 16, 2018

(86) PCT No.: PCT/KR2018/014135
§ 371 (c)(1),
(2) Date: Jan. 15, 2019

(87) PCT Pub. No.: WO2019/098770
PCT Pub. Date: May 23, 2019

(65) Prior Publication Data
US 2019/0208550 A1    Jul. 4, 2019

Related U.S. Application Data

(60) Provisional application No. 62/588,147, filed on Nov. 17, 2017, provisional application No. 62/670,046, filed on May 11, 2018.

(51) Int. Cl.
*H04W 74/08* (2009.01)
*H04L 5/00* (2006.01)
(Continued)

(52) U.S. Cl.
CPC ....... *H04W 74/0833* (2013.01); *H04L 5/0094* (2013.01); *H04W 56/001* (2013.01); *H04W 72/0446* (2013.01)

(58) Field of Classification Search
CPC .......... H04W 74/0833; H04W 56/001; H04W 72/0446; H04L 5/0094
(Continued)

(56) References Cited

U.S. PATENT DOCUMENTS

| 2019/0053281 A1* | 2/2019 | Astrom | H04W 56/0015 |
| 2019/0104554 A1* | 4/2019 | Amuru | H04L 5/00 |
| 2019/0149305 A1* | 5/2019 | Zhou | H04L 5/0057 |

FOREIGN PATENT DOCUMENTS

| WO | 2017023066 A1 | 9/2017 | |
| WO | 2017176033 A1 | 10/2017 | |
| WO | WO-2019082152 A1 * | 5/2019 | H04W 74/00 |

OTHER PUBLICATIONS

Samsung, "Remaining details on PRACH procedure," R1-1717582, 3GPP TSG RAN WG1 Meeting 90bis, Prague, CZ Oct. 2017, pp. 9-10 (Year: 2017).*

(Continued)

*Primary Examiner* — Brenda H Pham
(74) *Attorney, Agent, or Firm* — Dentons US LLP

(57) ABSTRACT

The present invention discloses a method of transmitting a Physical Random Access Channel (PRACH) by a terminal in a wireless communication system. Specifically, the method includes: receiving first information related to a Synchronization Signal Block (SSB) and second information related to PRACH resources; and transmitting the PRACH on a valid PRACH resource among the PRACH resources based on the first and second information. In this case, valid PRACH resource may be a PRACH resource allocated after symbols in which the SSB is received among the PRACH resources included in a PRACH slot related to the second information.

11 Claims, 18 Drawing Sheets

(51) Int. Cl.
*H04W 56/00* (2009.01)
*H04W 72/04* (2009.01)

(58) Field of Classification Search
USPC .................................. 370/322, 341, 348, 350
See application file for complete search history.

(56) References Cited

OTHER PUBLICATIONS

Huawei et al., 'RACH Procedures and Resource Configuration', R1-1700049, 3GPP TSG RAN WG1 NR Ad Hoc Meeting, Jan. 9, 2017. See Section 2.1.1 and Figure 1-5. (Year: 2017).*
Ericsson, 'NR-RACH preamble format details', R1-1711380, 3GPP TSG RAN WG1 NR Ad-Hoc#2, Jun. 17, 2017. See Section 2.1.2. ( Year: 2017).*
R1-1718582: 3GPP TSG RAN WG1 Meeting #90bis, Nagoya, Japan, Oct. 9-13, 2017, "On PDSCH and PUSCH RE Mapping," Qualcomm Incorporated, pp. 1-4.
R1-1718303: 3GPP TSG RAN WG1 Meeting 90bis, Prague, Czech Republic, Oct. 9-13, 2017, "Remaining details on PRACH procedure," Nokia, pp. 1-11.
R1-1718532: 3GPP TSG-RAN WG1 Meeting #90bis, Prague, Czech Republic, Oct. 9-13, 2017, "PRACH Procedure Considerations," Qualcomm Incorporated, pp. 1-13.

* cited by examiner

FIG. 1
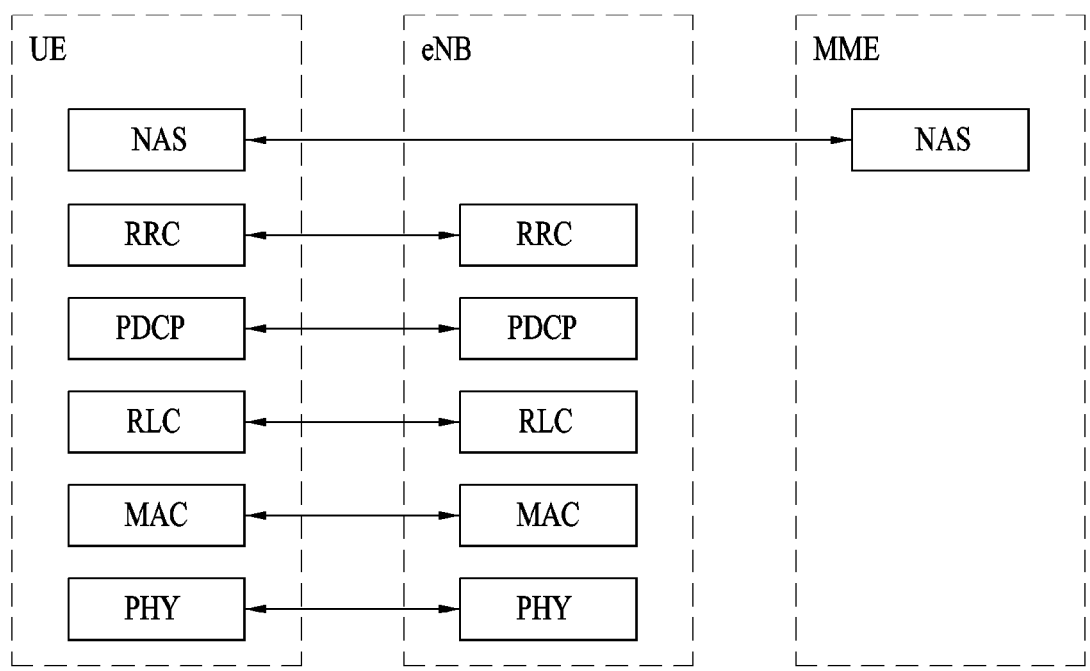
(A) CONTROL-PLANE PROTOCOL STACK
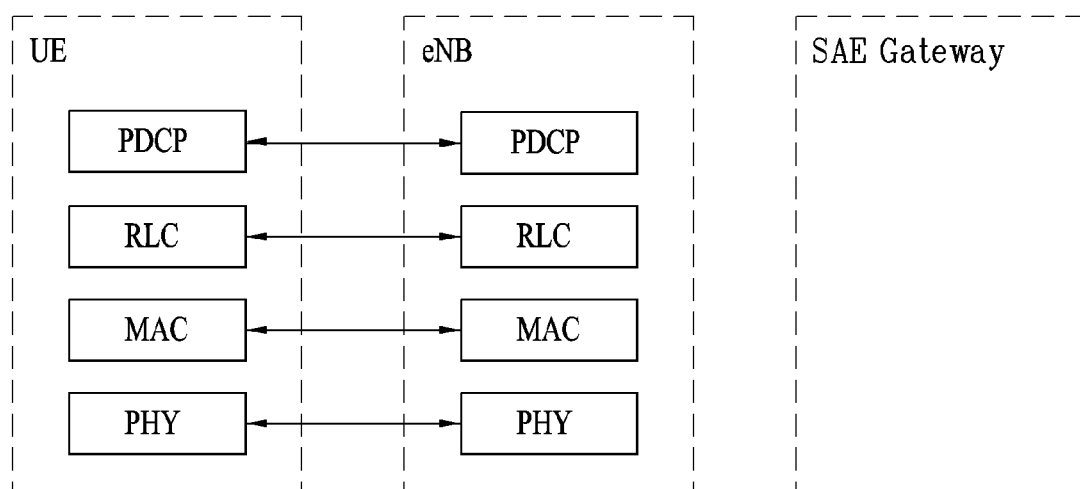
(B) USER-PLANE PROTOCOL STACK

FIG. 14

| OS index | 0 | | 1 | | 2 | | 3 | | 4 | | 5 | | 6 | | 7 | | 8 | | 9 | | 10 | | 11 | | 12 | | 13 | |
|---|---|---|---|---|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 0 | 1 | 2 | 3 | 4 | 5 | 6 | 7 | 8 | 9 | 10 | 11 | 12 | 13 |
| 15kHz SCS | | | | | | | | | | | | | | | | | | | | | | | | | | | | |
| 30kHz SCS (1) | | | | | | | | | | | | | | | | | | | | | | | | | | | | |
| 30kHz SCS (2) | | | | | | | | | | | | | | | | | | | | | | | | | | | | |

(a)

| OS index | 0 | | 1 | | 2 | | 3 | | 4 | | 5 | | 6 | | 7 | | 8 | | 9 | | 10 | | 11 | | 12 | | 13 | |
|---|---|---|---|---|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 0 | 1 | 2 | 3 | 4 | 5 | 6 | 7 | 8 | 9 | 10 | 11 | 12 | 13 |
| 120kHz SCS | | | | | | | | | | | | | | | | | | | | | | | | | | | | |
| 240kHz SCS | | | | | | | | | | | | | | | | | | | | | | | | | | | | |

(b)

METHOD OF TRANSMITTING AND RECEIVING PHYSICAL RANDOM ACCESS CHANNEL AND DEVICE THEREFOR

This application is a 35 use § 371 national stage entry of international application no. PCT/KR2018/014135 filed on Nov. 16, 2018, and claims priority to U.S. provisional application nos. 62/588,147 filed on Nov. 17, 2017 and 62/670,046 filed on May 11, 2018, all of which are hereby incorporated by reference in their entireties as if fully set forth herein.

TECHNICAL FIELD

The present invention relates to a method of transmitting and receiving a Physical Random Access Channel (PRACH) and device therefor, and more particularly, to a method of transmitting a PRACH on a valid PRACH resource where PRACH transmission can be performed among PRACH resources allocated by a PRACH configuration and device therefor.

BACKGROUND ART

As more and more communication devices demand larger communication traffic along with the current trends, a future-generation 5th generation (5G) system is required to provide an enhanced wireless broadband communication, compared to the legacy LTE system. In the future-generation 5G system, communication scenarios are divided into enhanced mobile broadband (eMBB), ultra-reliability and low-latency communication (URLLC), massive machine-type communication (mMTC), and so on.

Herein, eMBB is a future-generation mobile communication scenario characterized by high spectral efficiency, high user experienced data rate, and high peak data rate, URLLC is a future-generation mobile communication scenario characterized by ultra high reliability, ultra low latency, and ultra high availability (e.g., vehicle to everything (V2X), emergency service, and remote control), and mMTC is a future-generation mobile communication scenario characterized by low cost, low energy, short packet, and massive connectivity (e.g., Internet of things (IoT)).

DISCLOSURE OF THE INVENTION

Technical Task

The object of the present invention is to provide a method of transmitting and receiving a PRACH and device therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an embodiment of the present invention, provided is a method of transmitting a Physical Random Access Channel (PRACH) by a terminal in a wireless communication system. The method may include: receiving first information related to a Synchronization Signal Block (SSB) and second information related to PRACH resources; and transmitting the PRACH on a valid PRACH resource among the PRACH resources based on the first and second information. The valid PRACH resource may be a PRACH resource allocated after symbols in which the SSB is received among the PRACH resources included in a PRACH slot related to the second information.

In this case, the valid PRACH resource may be a PRACH resource not allocated as a downlink resource by an Uplink/Downlink (UL/DL) configuration among the PRACH resources.

In addition, among the PRACH resources, a PRACH resource allocated as an uplink resource by the UL/DL configuration may be the valid PRACH resource.

Moreover, the valid PRACH resource may be a PRACH resource allocated after a gap based on subcarrier spacing for the PRACH resource from the symbols where the SSB is received.

Further, when the subcarrier spacing is 120 kHz, the gap may be composed of two symbols.

In another embodiment of the present invention, provided is a communication device for transmitting a Physical Random Access Channel (PRACH) in a wireless communication system. The communication device may include: a memory; and a processor connected to the memory, the processor configured to: receive first information related to a Synchronization Signal Block (SSB) and second information related to PRACH resources; and transmit the PRACH on a valid PRACH resource among the PRACH resources based on the first and second information. The valid PRACH resource may be a PRACH resource allocated after symbols in which the SSB is received among the PRACH resources included in a PRACH slot related to the second information.

In this case, the valid PRACH resource may be a PRACH resource not allocated as a downlink resource by an Uplink/Downlink (UL/DL) configuration among the PRACH resources.

In addition, among the PRACH resources, a PRACH resource allocated as an uplink resource by the UL/DL configuration may be the valid PRACH resource.

Moreover, the valid PRACH resource may be a PRACH resource allocated after a gap based on subcarrier spacing for the PRACH resource from the symbols where the SSB is received.

Further, when the subcarrier spacing is 120 kHz, the gap may be composed of two symbols.

In a further embodiment of the present invention, provided is a method of receiving a Physical Random Access Channel (PRACH) by a base station in a wireless communication system. The method may include: transmitting first information related to a Synchronization Signal Block (SSB) and second information related to PRACH resources; and receiving the PRACH on a valid PRACH resource among the PRACH resources based on the first and second information. The valid PRACH resource may be a PRACH resource allocated after symbols in which the SSB is received among the PRACH resources included in a PRACH slot related to the second information.

Advantageous Effects

According to the present invention, it is possible to mitigate a problem that a collision occurs in PRACH transmission due to SSB transmission, thereby performing the PRACH transmission efficiently.

It will be appreciated by persons skilled in the art that the effects that can be achieved with the present disclosure are not limited to what has been particularly described hereinabove and other effects of the present disclosure will be more clearly understood from the following detailed description taken in conjunction with the accompanying drawings.

DESCRIPTION OF DRAWINGS

FIG. 1 is a view illustrating the control-plane and user-plane architecture of radio interface protocols between a user equipment (UE) and an evolved UMTS terrestrial radio access network (E-UTRAN) in conformance to a $3^{rd}$ generation partnership project (3GPP) radio access network standard.

FIG. 14 is a view illustrating a candidate SSB region in which an SSB can be transmitted.

BEST MODE FOR INVENTION

Figure 2:
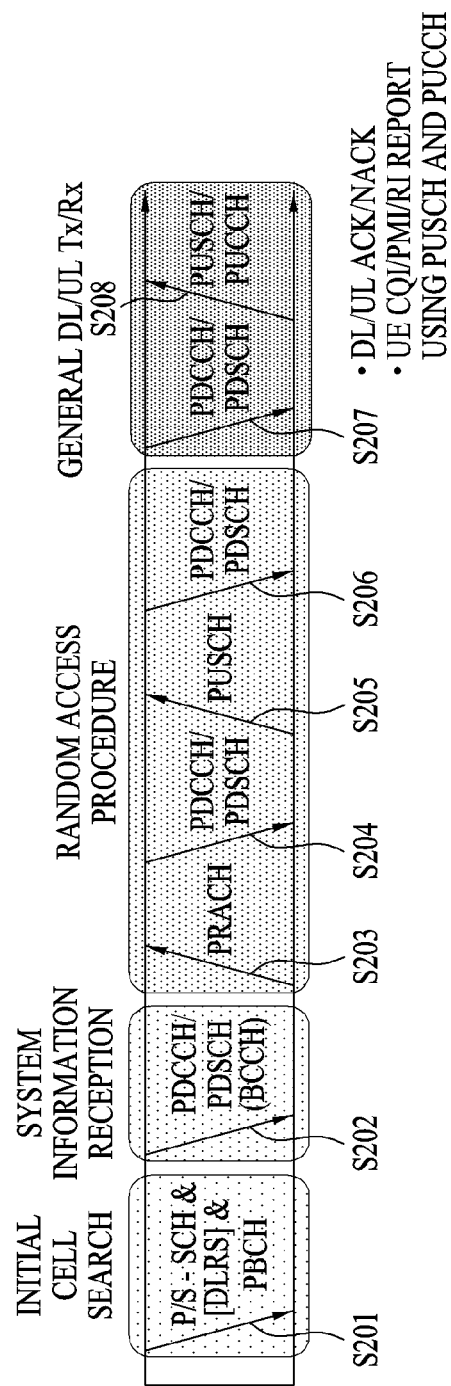
FIG. 2 is a view illustrating physical channels and a general signal transmission method using the physical channels in a 3GPP system.

The configuration, operation, and other features of the present disclosure will readily be understood with embodiments of the present disclosure described with reference to the attached drawings. Embodiments of the present disclosure as set forth herein are examples in which the technical features of the present disclosure are applied to a $3^{rd}$ generation partnership project (3GPP) system.

While embodiments of the present disclosure are described in the context of long term evolution (LTE) and LTE-advanced (LTE-A) systems, they are purely exemplary. Therefore, the embodiments of the present disclosure are applicable to any other communication system as long as the above definitions are valid for the communication system.

The term, Base Station (BS) may be used to cover the meanings of terms including remote radio head (RRH), evolved Node B (eNB or eNode B), transmission point (TP), reception point (RP), relay, and so on.

The 3GPP communication standards define downlink (DL) physical channels corresponding to resource elements (REs) carrying information originated from a higher layer, and DL physical signals which are used in the physical layer and correspond to REs which do not carry information originated from a higher layer. For example, physical downlink shared channel (PDSCH), physical broadcast channel (PBCH), physical multicast channel (PMCH), physical control format indicator channel (PCFICH), physical downlink control channel (PDCCH), and physical hybrid ARQ indicator channel (PHICH) are defined as DL physical channels, and reference signals (RSs) and synchronization signals (SSs) are defined as DL physical signals. An RS, also called a pilot signal, is a signal with a predefined special waveform known to both a gNode B (gNB) and a UE. For example, cell specific RS, UE-specific RS (UE-RS), positioning RS (PRS), and channel state information RS (CSI-RS) are defined as DL RSs. The 3GPP LTE/LTE-A standards define uplink (UL) physical channels corresponding to REs carrying information originated from a higher layer, and UL physical signals which are used in the physical layer and correspond to REs which do not carry information originated from a higher layer. For example, physical uplink shared channel (PUSCH), physical uplink control channel (PUCCH), and physical random access channel (PRACH) are defined as UL physical channels, and a demodulation reference signal (DMRS) for a UL control/data signal, and a sounding reference signal (SRS) used for UL channel measurement are defined as UL physical signals.

In the present disclosure, the PDCCH/PCFICH/PHICH/PDSCH refers to a set of time-frequency resources or a set of REs, which carry downlink control information (DCI)/a control format indicator (CFI)/a DL acknowledgement/negative acknowledgement (ACK/NACK)/DL data. Further, the PUCCH/PUSCH/PRACH refers to a set of time-frequency resources or a set of REs, which carry UL control information (UCI)/UL data/a random access signal. In the present disclosure, particularly a time-frequency resource or an RE which is allocated to or belongs to the PDCCH/PCFICH/PHICH/PDSCH/PUCCH/PUSCH/PRACH is referred to as a PDCCH RE/PCFICH RE/PHICH RE/PDSCH RE/PUCCH RE/PUSCH RE/PRACH RE or a PDCCH resource/PCFICH resource/PHICH resource/PDSCH resource/PUCCH resource/PUSCH resource/PRACH resource. Hereinbelow, if it is said that a UE transmits a PUCCH/PUSCH/PRACH, this means that UCI/UL data/a random access signal is transmitted on or through the PUCCH/PUSCH/PRACH. Further, if it is said that a gNB transmits a PDCCH/PCFICH/PHICH/PDSCH, this means that DCI/control information is transmitted on or through the PDCCH/PCFICH/PHICH/PDSCH.

Hereinbelow, an orthogonal frequency division multiplexing (OFDM) symbol/carrier/subcarrier/RE to which a CRS/DMRS/CSI-RS/SRS/UE-RS is allocated to or for which the CRS/DMRS/CSI-RS/SRS/UE-RS is configured is referred to as a CRS/DMRS/CSI-RS/SRS/UE-RS symbol/carrier/subcarrier/RE. For example, an OFDM symbol to which a tracking RS (TRS) is allocated or for which the TRS is configured is referred to as a TRS symbol, a subcarrier to which a TRS is allocated or for which the TRS is configured is referred to as a TRS subcarrier, and an RE to which a TRS is allocated or for which the TRS is configured is referred to as a TRS RE. Further, a subframe configured to transmit a TRS is referred to as a TRS subframe. Further, a subframe carrying a broadcast signal is referred to as a broadcast subframe or a PBCH subframe, and a subframe carrying a synchronization signal (SS) (e.g., a primary synchronization signal (PSS) and/or a secondary synchronization signal (SSS)) is referred to as an SS subframe or a PSS/SSS subframe. An OFDM symbol/subcarrier/RE to which a PSS/SSS is allocated to or for which the PSS/SSS is configured is referred to as a PSS/SSS symbol/subcarrier/RE.

In the present disclosure, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna port configured to transmit CRSs may be distinguished from each other by the positions of REs occupied by the CRSs according to CRS ports, antenna ports configured to transmit UE-RSs may be distinguished from each other by the positions of REs occupied by the UE-RSs according to UE-RS ports, and antenna ports configured to transmit CSI-RSs may be distinguished from each other by the positions of REs occupied by the CSI-RSs according to CSI-RS ports. Therefore, the term CRS/UE-RS/CSI-RS/TRS port is also used to refer to a pattern of REs occupied by a CRS/UE-RS/CSI-RS/TRS in a predetermined resource area.

FIG. 1 illustrates control-plane and user-plane protocol stacks in a radio interface protocol architecture conforming to a 3GPP wireless access network standard between a user equipment (UE) and an evolved UMTS terrestrial radio access network (E-UTRAN). The control plane is a path in which the UE and the E-UTRAN transmit control messages to manage calls, and the user plane is a path in which data generated from an application layer, for example, voice data or Internet packet data is transmitted.

A physical (PHY) layer at layer 1 (L1) provides information transfer service to its higher layer, a medium access control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in orthogonal frequency division multiple access (OFDMA) for downlink (DL) and in single carrier frequency division multiple access (SC-FDMA) for uplink (UL).

The MAC layer at layer 2 (L2) provides service to its higher layer, a radio link control (RLC) layer via logical channels. The RLC layer at L2 supports reliable data transmission. RLC functionality may be implemented in a function block of the MAC layer. A packet data convergence protocol (PDCP) layer at L2 performs header compression to reduce the amount of unnecessary control information and thus efficiently transmit Internet protocol (IP) packets such as IP version 4 (IPv4) or IP version 6 (IPv6) packets via an air interface having a narrow bandwidth.

A radio resource control (RRC) layer at the lowest part of layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a broadcast channel (BCH) carrying system information, a paging channel (PCH) carrying a paging message, and a shared channel (SCH) carrying user traffic or a control message. DL multicast traffic or control messages or DL broadcast traffic or control messages may be transmitted on a DL SCH or a separately defined DL multicast channel (MCH). UL transport channels used to deliver data from a UE to the E-UTRAN include a random access channel (RACH) carrying an initial control message and a UL SCH carrying user traffic or a control message. Logical channels that are defined above transport channels and mapped to the transport channels include a broadcast control channel (BCCH), a paging control channel (PCCH), a Common Control Channel (CCCH), a multicast control channel (MCCH), a multicast traffic channel (MTCH), etc.

FIG. 2 illustrates physical channels and a general method for transmitting signals on the physical channels in the 3GPP system.

Referring to FIG. 2, when a UE is powered on or enters a new cell, the UE performs initial cell search (S201). The initial cell search involves acquisition of synchronization to an eNB. Specifically, the UE synchronizes its timing to the eNB and acquires a cell identifier (ID) and other information by receiving a primary synchronization channel (P-SCH) and a secondary synchronization channel (S-SCH) from the eNB. Then the UE may acquire information broadcast in the cell by receiving a physical broadcast channel (PBCH) from the eNB. During the initial cell search, the UE may monitor a DL channel state by receiving a DownLink reference signal (DL RS).

After the initial cell search, the UE may acquire detailed system information by receiving a physical downlink control channel (PDCCH) and receiving a physical downlink shared channel (PDSCH) based on information included in the PDCCH (S202).

If the UE initially accesses the eNB or has no radio resources for signal transmission to the eNB, the UE may perform a random access procedure with the eNB (S203 to S206). In the random access procedure, the UE may transmit a predetermined sequence as a preamble on a physical random access channel (PRACH) (S203 and S205) and may receive a response message to the preamble on a PDCCH and a PDSCH associated with the PDCCH (S204 and S206). In the case of a contention-based RACH, the UE may additionally perform a contention resolution procedure.

After the above procedure, the UE may receive a PDCCH and/or a PDSCH from the eNB (S207) and transmit a physical uplink shared channel (PUSCH) and/or a physical uplink control channel (PUCCH) to the eNB (S208), which is a general DL and UL signal transmission procedure. Particularly, the UE receives downlink control information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL acknowledgment/negative acknowledgment (ACK/NACK) signal, a channel quality indicator (CQI), a precoding matrix index (PMI), a rank indicator (RI), etc. In the 3GPP LTE system, the UE may transmit control information such as a CQI, a PMI, an RI, etc. on a PUSCH and/or a PUCCH.

Figure 3:
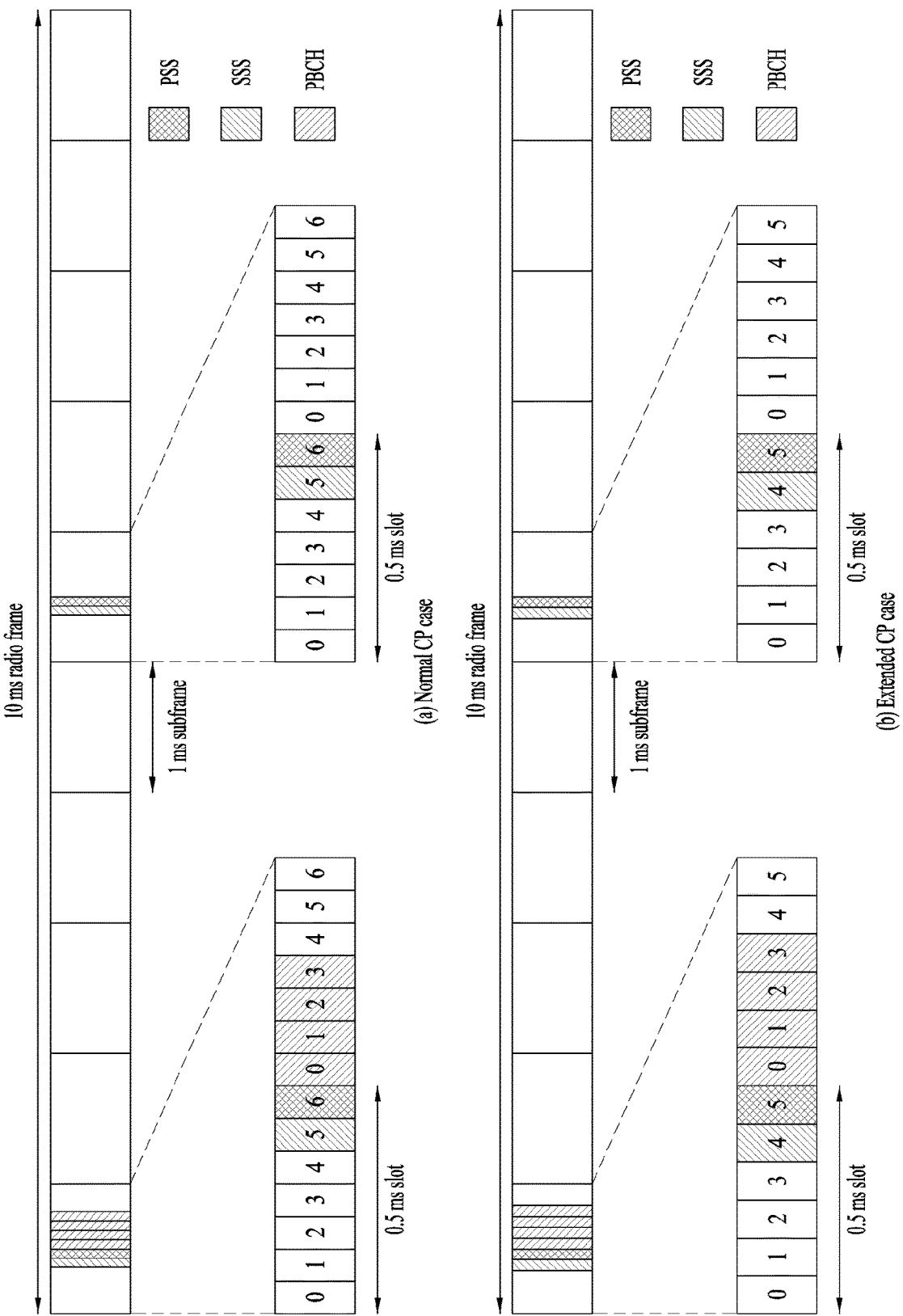
FIG. 3 is a view illustrating a radio frame structure for transmitting a synchronization signal (SS) in a long term evolution (LTE) system.

FIG. 3 is a diagram illustrating a radio frame structure for transmitting a synchronization signal (SS) in LTE system. In particular, FIG. 3 illustrates a radio frame structure for transmitting a synchronization signal and PBCH in frequency division duplex (FDD). FIG. 3(a) shows positions at which the SS and the PBCH are transmitted in a radio frame configured by a normal cyclic prefix (CP) and FIG. 3(b)

shows positions at which the SS and the PBCH are transmitted in a radio frame configured by an extended CP.

An SS will be described in more detail with reference to FIG. 3. An SS is categorized into a primary synchronization signal (PSS) and a secondary synchronization signal (SSS). The PSS is used to acquire time-domain synchronization such as OFDM symbol synchronization, slot synchronization, etc. and/or frequency-domain synchronization. And, the SSS is used to acquire frame synchronization, a cell group ID, and/or a CP configuration of a cell (i.e. information indicating whether to a normal CP or an extended is used). Referring to FIG. 3, a PSS and an SSS are transmitted through two OFDM symbols in each radio frame. Particularly, the SS is transmitted in first slot in each of subframe 0 and subframe 5 in consideration of a GSM (Global System for Mobile communication) frame length of 4.6 ms for facilitation of inter-radio access technology (inter-RAT) measurement. Especially, the PSS is transmitted in a last OFDM symbol in each of the first slot of subframe 0 and the first slot of subframe 5. And, the SSS is transmitted in a second to last OFDM symbol in each of the first slot of subframe 0 and the first slot of subframe 5. Boundaries of a corresponding radio frame may be detected through the SSS. The PSS is transmitted in the last OFDM symbol of the corresponding slot and the SSS is transmitted in the OFDM symbol immediately before the OFDM symbol in which the PSS is transmitted. According to a transmission diversity scheme for the SS, only a single antenna port is used. However, the transmission diversity scheme for the SS standards is not separately defined in the current standard.

Referring to FIG. 3, by detecting the PSS, a UE may know that a corresponding subframe is one of subframe 0 and subframe 5 since the PSS is transmitted every 5 ms but the UE cannot know whether the subframe is subframe 0 or subframe 5. That is, frame synchronization cannot be obtained only from the PSS. The UE detects the boundaries of the radio frame in a manner of detecting an SSS which is transmitted twice in one radio frame with different sequences.

Having demodulated a DL signal by performing a cell search procedure using the PSS/SSS and determined time and frequency parameters necessary to perform UL signal transmission at an accurate time, a UE can communicate with an eNB only after obtaining system information necessary for a system configuration of the UE from the eNB.

The system information is configured with a master information block (MIB) and system information blocks (SIBs). Each SIB includes a set of functionally related parameters and is categorized into an MIB, SIB Type 1 (SIB1), SIB Type 2 (SIB2), and SIB3 to SIB8 according to the included parameters.

The MIB includes most frequently transmitted parameters which are essential for a UE to initially access a network served by an eNB. The UE may receive the MIB through a broadcast channel (e.g. a PBCH). The MIB includes a downlink system bandwidth (DL BW), a PHICH configuration, and a system frame number (SFN). Thus, the UE can explicitly know information on the DL BW, SFN, and PHICH configuration by receiving the PBCH. On the other hand, the UE may implicitly know information on the number of transmission antenna ports of the eNB. The information on the number of the transmission antennas of the eNB is implicitly signaled by masking (e.g. XOR operation) a sequence corresponding to the number of the transmission antennas to 16-bit cyclic redundancy check (CRC) used in detecting an error of the PBCH.

The SIB1 includes not only information on time-domain scheduling for other SIBs but also parameters necessary to determine whether a specific cell is suitable in cell selection. The UE receives the SIB1 via broadcast signaling or dedicated signaling.

A DL carrier frequency and a corresponding system bandwidth can be obtained by MIB carried by PBCH. A UL carrier frequency and a corresponding system bandwidth can be obtained through system information corresponding to a DL signal. Having received the MIB, if there is no valid system information stored in a corresponding cell, a UE applies a value of a DL BW included in the MIB to a UL bandwidth until system information block type 2 (SystemInformationBlockType2, SIB2) is received. For example, if the UE obtains the SIB2, the UE is able to identify the entire UL system bandwidth capable of being used for UL transmission through UL-carrier frequency and UL-bandwidth information included in the SIB2.

In the frequency domain, PSS/SSS and PBCH are transmitted irrespective of an actual system bandwidth in total 6 RBs, i.e., 3 RBs in the left side and 3 RBs in the right side with reference to a DC subcarrier within a corresponding OFDM symbol. In other words, the PSS/SSS and the PBCH are transmitted only in 72 subcarriers. Therefore, a UE is configured to detect or decode the SS and the PBCH irrespective of a downlink transmission bandwidth configured for the UE.

Having completed the initial cell search, the UE can perform a random access procedure to complete the accessing the eNB. To this end, the UE transmits a preamble via PRACH (physical random access channel) and can receive a response message via PDCCH and PDSCH in response to the preamble. In case of contention based random access, it may transmit additional PRACH and perform a contention resolution procedure such as PDCCH and PDSCH corresponding to the PDCCH.

Having performed the abovementioned procedure, the UE can perform PDCCH/PDSCH reception and PUSCH/PUCCH transmission as a general UL/DL signal transmission procedure.

The random access procedure is also referred to as a random access channel (RACH) procedure. The random access procedure is used for various usages including initial access, UL synchronization adjustment, resource allocation, handover, and the like. The random access procedure is categorized into a contention-based procedure and a dedicated (i.e., non-contention-based) procedure. In general, the contention-based random access procedure is used for performing initial access. On the other hand, the dedicated random access procedure is restrictively used for performing handover, and the like. When the contention-based random access procedure is performed, a UE randomly selects a RACH preamble sequence. Hence, a plurality of UEs can transmit the same RACH preamble sequence at the same time. As a result, a contention resolution procedure is required thereafter. On the contrary, when the dedicated random access procedure is performed, the UE uses an RACH preamble sequence dedicatedly allocated to the UE by an eNB. Hence, the UE can perform the random access procedure without a collision with a different UE.

The contention-based random access procedure includes 4 steps described in the following. Messages transmitted via the 4 steps can be respectively referred to as message (Msg) 1 to 4 in the present invention.

Step 1: RACH preamble (via PRACH) (UE to eNB)
Step 2: Random access response (RAR) (via PDCCH and
    PDSCH (eNB to)

Step 3: Layer 2/Layer 3 message (via PUSCH) (UE to eNB)

Step 4: Contention resolution message (eNB to UE)

On the other hand, the dedicated random access procedure includes 3 steps described in the following. Messages transmitted via the 3 steps can be respectively referred to as message (Msg) 0 to 2 in the present invention. It may also perform uplink transmission (i.e., step 3) corresponding to PAR as a part of the ransom access procedure. The dedicated random access procedure can be triggered using PDCCH (hereinafter, PDCCH order) which is used for an eNB to indicate transmission of an RACH preamble.

Step 0: RACH preamble assignment via dedicated signaling (eNB to UE)

Step 1: RACH preamble (via PRACH) (UE to eNB)

Step 2: Random access response(RAR) (via PDCCH and PDSCH) (eNB to UE)

After the RACH preamble is transmitted, the UE attempts to receive a random access response (RAR) in a preconfigured time window. Specifically, the UE attempts to detect PDCCH (hereinafter, RA-RNTI PDCCH) (e.g., a CRC masked with RA-RNTI in PDCCH) having RA-RNTI (random access RNTI) in a time window. If the RA-RNTI PDCCH is detected, the UE checks whether or not there is a RAR for the UE in PDSCH corresponding to the RA-RNTI PDCCH. The RAR includes timing advance (TA) information indicating timing offset information for UL synchronization, UL resource allocation information (UL grant information), a temporary UE identifier (e.g., temporary cell-RNTI, TC-RNTI), and the like. The UE can perform UL transmission (e.g., message 3) according to the resource allocation information and the TA value included in the RAR. HARQ is applied to UL transmission corresponding to the RAR. In particular, the UE can receive reception response information (e.g., PHICH) corresponding to the message 3 after the message 3 is transmitted.

A random access preamble (i.e. RACH preamble) consists of a cyclic prefix of a length of TCP and a sequence part of a length of TSEQ. The TCP and the TSEQ depend on a frame structure and a random access configuration. A preamble format is controlled by higher layer. The RACH preamble is transmitted in a UL subframe. Transmission of the random access preamble is restricted to a specific time resource and a frequency resource. The resources are referred to as PRACH resources. In order to match an index 0 with a PRB and a subframe of a lower number in a radio frame, the PRACH resources are numbered in an ascending order of PRBs in subframe numbers in the radio frame and frequency domain. Random access resources are defined according to a PRACH configuration index (refer to 3GPP TS 36.211 standard document). The RACH configuration index is provided by a higher layer signal (transmitted by an eNB).

In the LTE/LTE-A system, a subcarrier spacing for a random access preamble (i.e., RACH preamble) is regulated by 1.25 kHz and 7.5 kHz for preamble formats 0 to 3 and a preamble format 4, respectively (refer to 3GPP TS 36.211).

Figure 4:
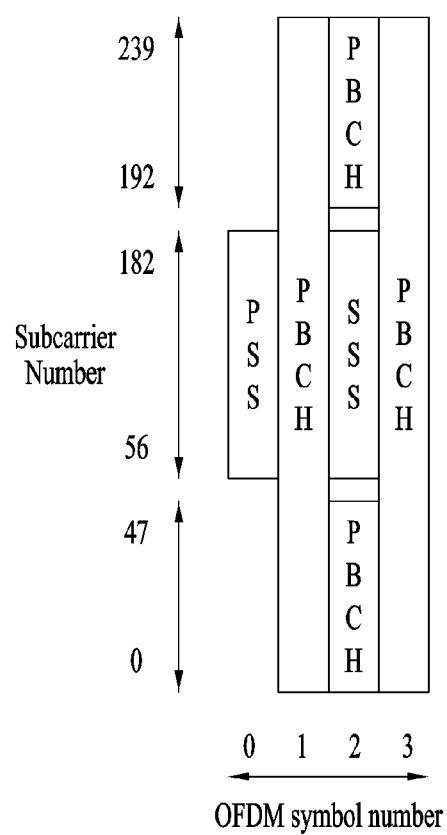
FIG. 4 is a view illustrating a structure of an SS/PBCH block used in an NR system.

FIG. 4 illustrates an SSB structure. The UE may perform cell search, system information acquisition, beam alignment for initial connection, DL measurement, etc. based on the SSB. The SSB is used interchangeably with the synchronization signal/physical broadcast channel (SS/PBCH) block.

Referring to FIG. 4, an SSB is composed of a PSS, a SSS and a PBCH. The SSB is composed of four consecutive OFDM symbols. The PSS, the PBCH, the SSS/PBCH and the PBCH are transmitted on each OFDM symbol, respectively. The PSS and the SSS are each composed of one OFDM symbol and 127 subcarriers, and the PBCH is composed of 3 OFDM symbols and 576 subcarriers. Polar coding and quadrature phase shift keying (QPSK) are applied to the PBCH. The PBCH is composed of a data RE and a demodulation reference signal (DMRS) RE for each OFDM symbol. There are three DMRS REs per RB, and there are three data REs between the DMRS REs.

The NR system uses an OFDM transmission scheme or a similar transmission system. The new RAT system may conform to OFDM parameters different from the OFDM parameters of LTE. Alternatively, the new RAT system may conform to the numerology of legacy LTE/LTE-A, but have a larger system bandwidth (e.g., 100 MHz). Alternatively, one cell may support a plurality of numerologies. That is, UEs operating with different numerologies may coexist within one cell.

Figure 5:
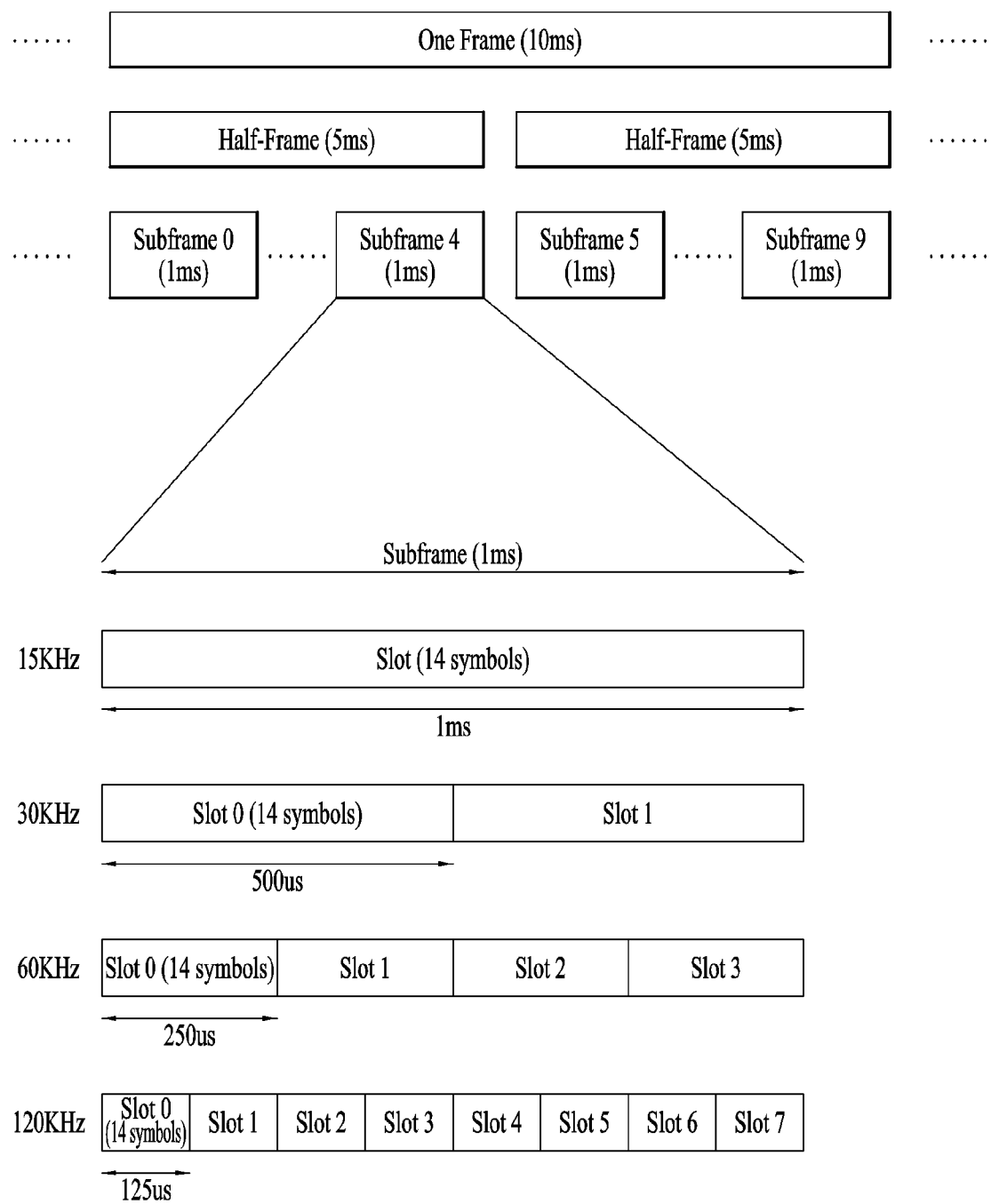
FIGS. 5 to 7 are views illustrating structures of a radio frame and slots used in the NR system.
Figure 6:
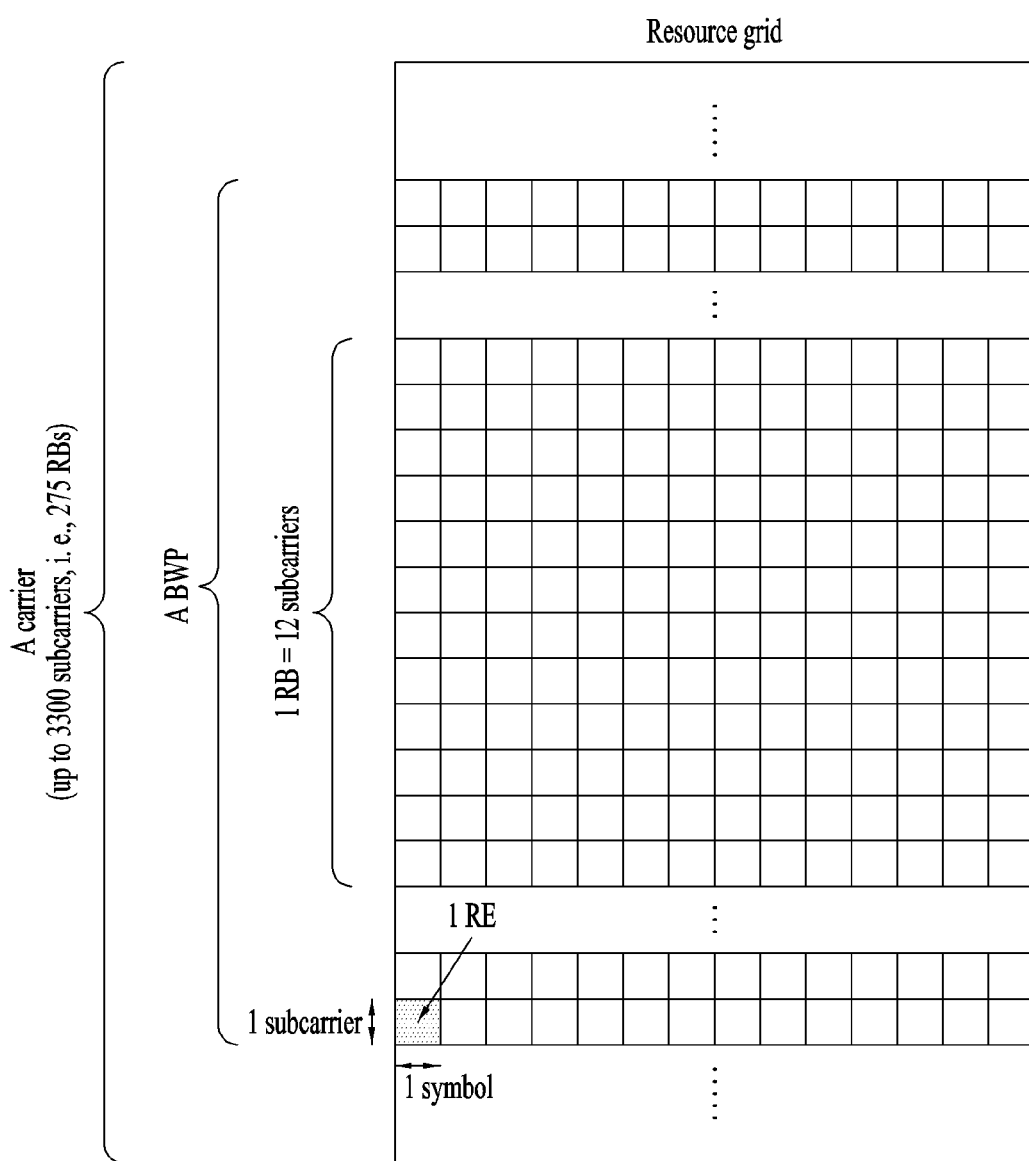

FIG. 5 illustrates a structure of a radio frame used in NR.

In NR, UL and DL transmissions are configured in frames. The radio frame has a length of 10 ms and is defined as two 5 ms half-frames (HF). The half-frame is defined as five 1 ms subframes (SF). A subframe is divided into one or more slots, and the number of slots in a subframe depends on subcarrier spacing (SCS). Each slot includes 12 or 14 OFDM(A) symbols according to a cyclic prefix (CP). When a normal CP is used, each slot includes 14 symbols. When an extended CP is used, each slot includes 12 symbols. Here, the symbols may include OFDM symbols (or CP-OFDM symbols) and SC-FDMA symbols (or DFT-s-OFDM symbols).

Table 1 illustrates that the number of symbols per slot, the number of slots per frame, and the number of slots per subframe vary according to the SCS when the normal CP

TABLE 1

| SCS (15 * 2^u) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

* $N^{slot}_{symb}$: Number of symbols in a slot * $N^{frame,u}_{slot}$: Number of slots in a frame
* $N^{subframe,u}_{slot}$: Number of slots in a subframe Table 2 illustrates that the number of symbols per slot, the number of slots per frame, and the number of slots per subframe vary according to the SCS when the extended CP is used.

TABLE 2

| SCS (15 * 2^u) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In the NR system, the OFDM(A) numerology (e.g., SCS, CP length, etc.) may be configured differently among a plurality of cells merged for one UE. Thus, the (absolute time) duration of a time resource (e.g., SF, slot or TTI) (referred to as a time unit (TU) for simplicity) composed of the same number of symbols may be set differently among the merged cells.

Figure 7:
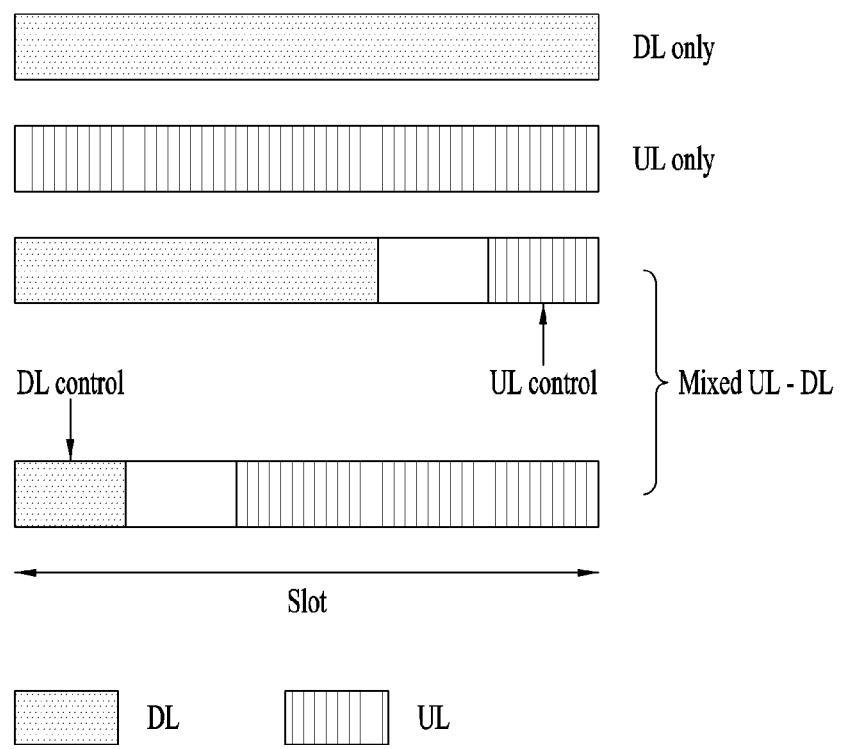

FIG. 7 illustrates a structure of a self-contained slot. In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.

1. DL only configuration
2. UL only configuration
3. Mixed UL-DL configuration
   DL region+Guard period (GP)+UL control region
   DL control region+GP+UL region
   DL region: (i) DL data region, (ii) DL control region+DL data region
   UL region: (i) UL data region, (ii) UL data region+UL control region The PDCCH may be transmitted in the DL control region, and the PDSCH may be transmitted in the DL data region. The PUCCH may be transmitted in the UL control region, and the PUSCH may be transmitted in the UL data region. Downlink control information (DCI), for example, DL data scheduling information, UL data scheduling information, and the like, may be transmitted on the PDCCH. Uplink control information (UCI), for example, ACK/NACK information about DL data, channel state information (CSI), and a scheduling request (SR), may be transmitted on the PUCCH. The GP provides a time gap in the process of the UE switching from the transmission mode to the reception mode or from the reception mode to the transmission mode. Some symbols at the time of switching from DL to UL within a subframe may be configured as the GP.

For a 5G mobile communication system under discussion, a technique of using an ultra-high frequency band, that is, a millimeter frequency band at or above 6 GHz is considered in order to transmit data to a plurality of users at a high transmission rate in a wide frequency band. The 3GPP calls this technique NR, and thus a 5G mobile communication system will be referred to as an NR system in the present disclosure. However, the millimeter frequency band has the frequency property that a signal is attenuated too rapidly according to a distance due to the use of too high a frequency band. Accordingly, the NR system using a frequency band at or above at least 6 GHz employs a narrow beam transmission scheme in which a signal is transmitted with concentrated energy in a specific direction, not omni-directionally, to thereby compensate for the rapid propagation attenuation and thus overcome the decrease of coverage caused by the rapid propagation attenuation. However, if a service is provided by using only one narrow beam, the service coverage of one gNB becomes narrow, and thus the gNB provides a service in a wideband by collecting a plurality of narrow beams.

As a wavelength becomes short in the millimeter frequency band, that is, millimeter wave (mmW) band, it is possible to install a plurality of antenna elements in the same area. For example, a total of 100 antenna elements may be installed at (wavelength) intervals of 0.5 lambda in a 30-GHz band with a wavelength of about 1 cm in a two-dimensional (2D) array on a 5 by 5 cm panel. Therefore, it is considered to increase coverage or throughput by increasing a beamforming gain through use of a plurality of antenna elements in mmW.

To form a narrow beam in the millimeter frequency band, a beamforming scheme is mainly considered, in which a gNB or a UE transmits the same signals with appropriate phase differences through multiple antennas, to thereby increase energy only in a specific direction. Such beamforming schemes include digital beamforming for generating a phase difference between digital baseband signals, analog beamforming for generating a phase difference between modulated analog signals by using a time delay (i.e., a cyclic shift), and hybrid beamforming using both digital beamforming and analog beamforming. If a TXRU is provided per antenna element to enable control of transmission power and a phase per antenna, independent beamforming per frequency resource is possible. However, installation of TXRUs for all of about 100 antenna elements is not effective in terms of cost. That is, to compensate for rapid propagation attenuation in the millimeter frequency band, multiple antennas should be used, and digital beamforming requires as many RF components (e.g., digital to analog converters (DACs), mixers, power amplifiers, and linear amplifiers) as the number of antennas. Accordingly, implementation of digital beamforming in the millimeter frequency band faces the problem of increased cost of communication devices. Therefore, in the case where a large number of antennas are required as in the millimeter frequency band, analog beamforming or hybrid beamforming is considered. In analog beamforming, a plurality of antenna elements are mapped to one TXRU, and the direction of a beam is controlled by an analog phase shifter. A shortcoming with this analog beamforming scheme is that frequency selective beamforming (BF) cannot be provided because only one beam direction can be produced in a total band. Hybrid BF stands between digital BF and analog BF, in which B TXRUs fewer than Q antenna elements are used. In hybrid BF, the directions of beams transmittable at the same time is limited to or below B although the number of beam directions is different according to connections between B TXRUs and Q antenna elements.

Digital BF performs signal processing on a digital baseband signal that is to be transmitted or is received as mentioned above, and therefore it may transmit or receive signals in multiple directions at the same time using multiple beams. In contrast, analog BF performs beamforming with a received analog signal or an analog signal to be transmitted in a modulated state, and therefore it cannot simultaneously transmit or receive signals in multiple directions beyond the range covered by one beam. In general, a gNB communicates with multiple users at the same time using broadband transmission or multi-antenna characteristics. When the gNB uses analog or hybrid BF and forms an analog beam in one beam direction, the gNB is allowed to communicate only with users included in the same analog beam direction due to the characteristics of analog BF. A RACH resource allocation scheme and a scheme of resource utilization in the gNB according to the present invention to be described later are proposed in consideration of constraints resulting from the characteristics of analog BF or hybrid BF.

Figure 8:
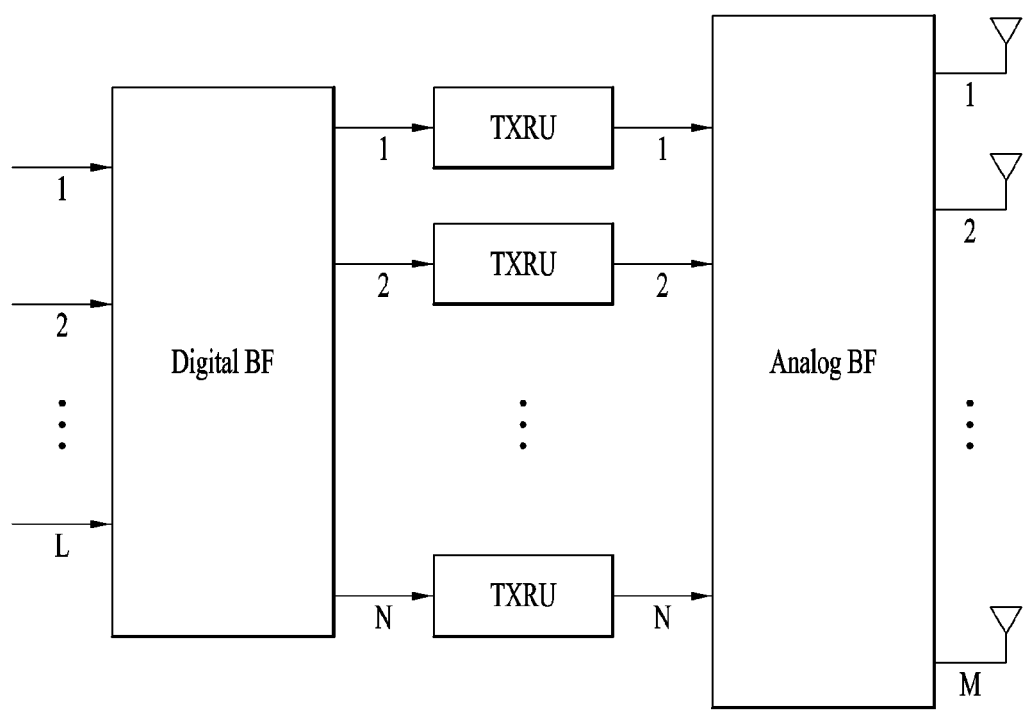
FIG. 8 is a view illustrating exemplary connection schemes between transceiver units (TXRUs) and antenna elements.

FIG. 8 abstractly illustrates a hybrid beamforming structure in terms of TXRUs and physical antennas.

For the case where multiple antennas are used, hybrid BF with digital BF and analog BF in combination has emerged. Analog BF (or RF BF) is an operation of performing precoding (or combining) in an RF unit. Due to precoding (combining) in each of a baseband unit and an RF unit, hybrid BF offers the benefit of performance close to the performance of digital BF, while reducing the number of RF chains and the number of DACs (or analog to digital converters (ADCs). For the convenience' sake, a hybrid BF structure may be represented by N TXRUs and M physical antennas. Digital BF for L data layers to be transmitted by a transmission end may be represented as an N-by-N matrix, and then N converted digital signals are converted to analog signals through TXRUs and subjected to analog BF represented as an M-by-N matrix. In FIG. 8, the number of digital beams is L, and the number of analog beams is N. Further, it is considered in the NR system that a gNB is configured to change analog BF on a symbol basis so as to more efficiently support BF for a UE located in a specific area. Further, when one antenna panel is defined by N TXRUs and M RF antennas, introduction of a plurality of antenna panels to which independent hybrid BF is applicable is also considered. As such, in the case where a gNB uses a plurality of analog beams, a different analog beam may be preferred for signal reception at each UE. Therefore, a beam sweeping operation is under consideration, in which for at least an SS, system information, and paging, a gNB changes a plurality of analog beams on a symbol basis in a specific slot or SF to allow all UEs to have reception opportunities.

Figure 9:
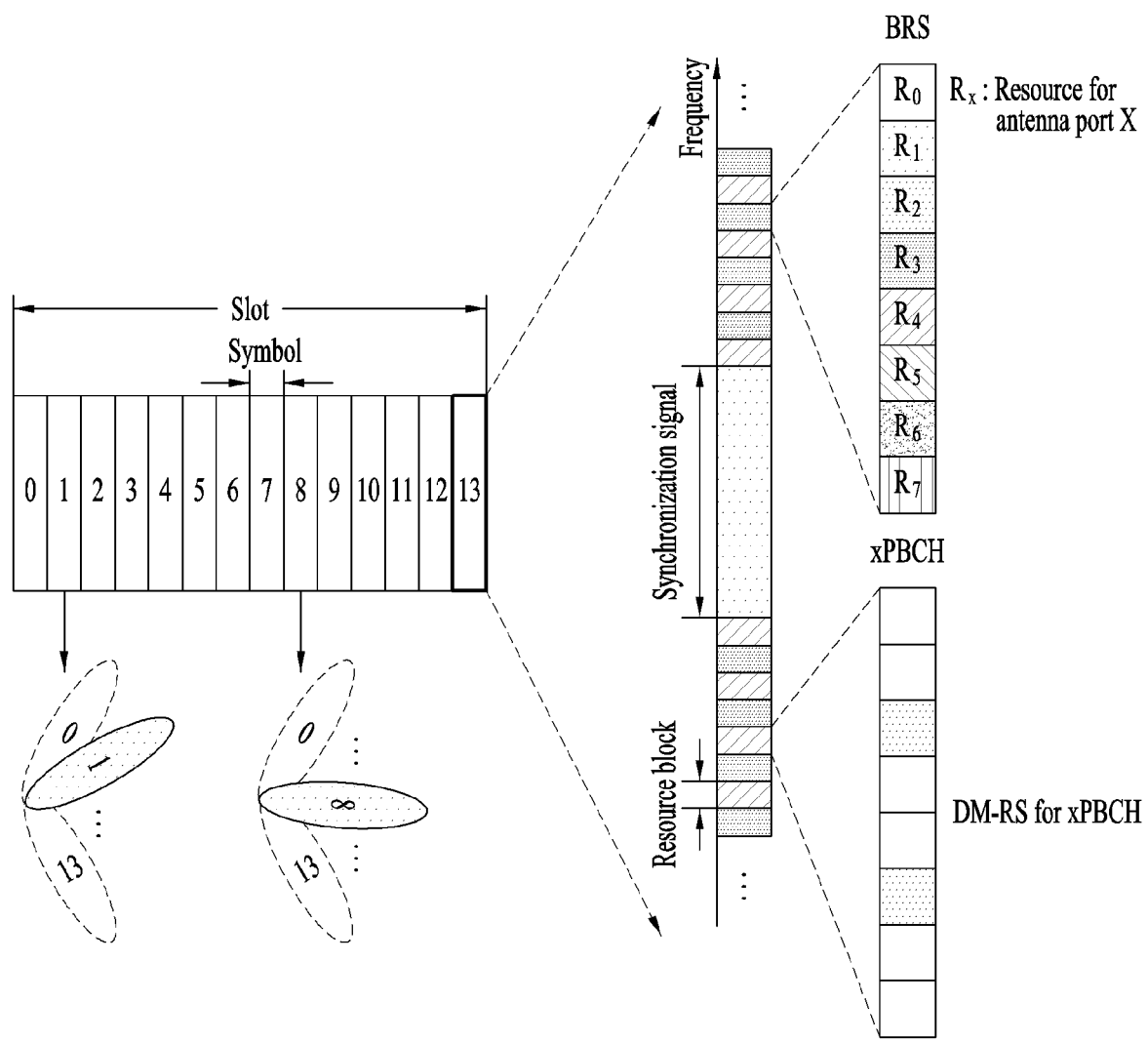
FIG. 9 is a view illustrating beam sweeping for a synchronization signal and system information during downlink (DL) transmission.

FIG. 9 is a view illustrating beam sweeping for an SS and system information during DL transmission. In FIG. 9, physical resources or a physical channel which broadcasts system information of the New RAT system is referred to as an xPBCH. Analog beams from different antenna panels may be transmitted simultaneously in one symbol, and introduction of a beam reference signal (BRS) transmitted for a single analog beam corresponding to a specific antenna panel as illustrated in FIG. 9 is under discussion in order to measure a channel per analog beam. BRSs may be defined for a plurality of antenna ports, and each antenna port of the BRSs may correspond to a single analog beam. Unlike the BRSs, the SS or the xPBCH may be transmitted for all analog beams included in an analog beam group so that any UE may receive the SS or the xPBCH successfully.

Figure 10:
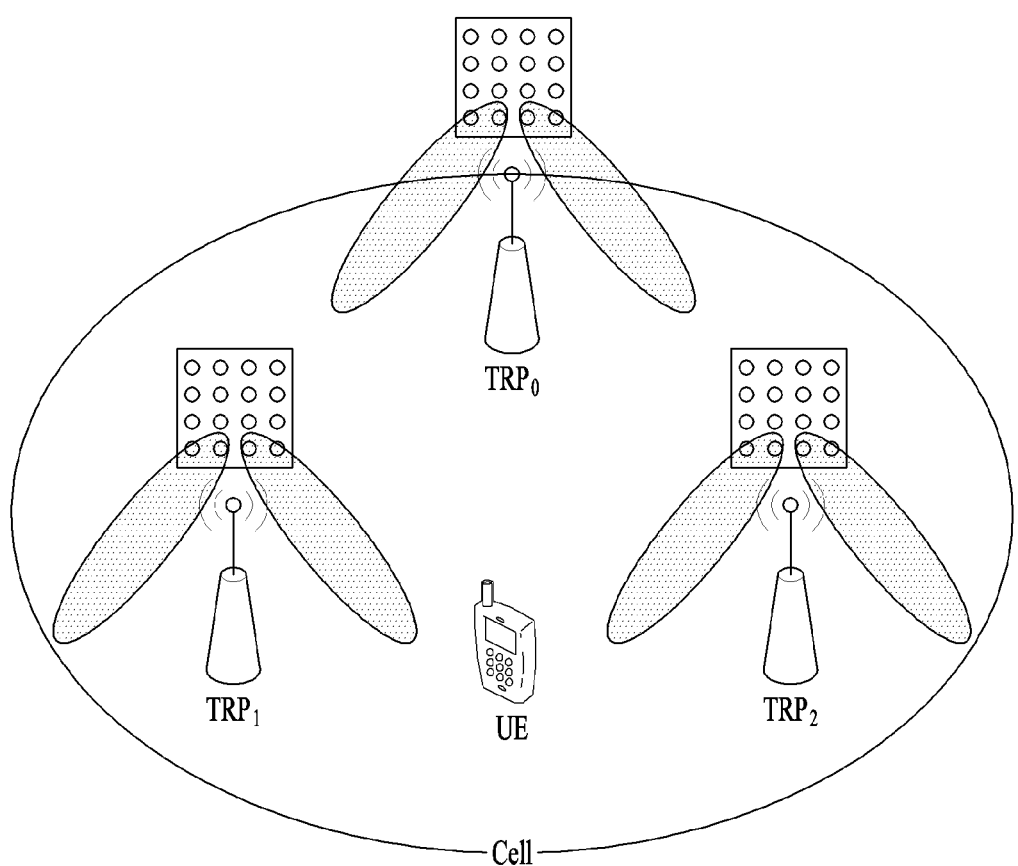
FIG. 10 is a view illustrating an exemplary cell in an NR system.

FIG. 10 is a view illustrating an exemplary cell in the NR system.

Referring to FIG. 10, compared to a wireless communication system such as legacy LTE in which one eNB forms one cell, configuration of one cell by a plurality of TRPs is under discussion in the NR system. If a plurality of TRPs form one cell, even though a TRP serving a UE is changed, seamless communication is advantageously possible, thereby facilitating mobility management for UEs.

Compared to the LTE/LTE-A system in which a PSS/SSS is transmitted omni-directionally, a method for transmitting a signal such as a PSS/SSS/PBCH through BF performed by sequentially switching a beam direction to all directions at a gNB applying mmWave is considered. The signal transmission/reception performed by switching a beam direction is referred to as beam sweeping or beam scanning. In the present disclosure, "beam sweeping" is a behavior of a transmission side, and "beam scanning" is a behavior of a reception side. For example, if up to N beam directions are available to the gNB, the gNB transmits a signal such as a PSS/SSS/PBCH in the N beam directions. That is, the gNB transmits an SS such as the PSS/SSS/PBCH in each direction by sweeping a beam in directions available to or supported by the gNB. Or if the gNB is capable of forming N beams, the beams may be grouped, and the PSS/SSS/PBCH may be transmitted/received on a group basis. One beam group includes one or more beams. Signals such as the PSS/SSS/PBCH transmitted in the same direction may be defined as one SS block (SSB), and a plurality of SSBs may exist in one cell. If a plurality of SSBs exist, an SSB index may be used to identify each SSB. For example, if the PSS/SSS/PBCH is transmitted in 10 beam directions in one system, the PSS/SSS/PBCH transmitted in the same direction may form an SSB, and it may be understood that 10 SSBs exist in the system. In the present disclosure, a beam index may be interpreted as an SSB index.

Hereinafter, a method of transmitting and receiving a Physical Random Access Channel (PRACH) according to the present invention will be described.

Before describing the present invention in detail, it is noted that Remaining Minimum System Information (RMSI) mentioned in this specification, which corresponds to system information obtained from on a Master Information Block (MIB) included in a PBCH, can be referred to as System Information Block 1 (SIB1).

In addition, the term "CORESET" mentioned in this specification means a region including monitoring occasions, where a UE can monitor PDCCH candidates. That is, a CORESET means a region including at least one search space for PDCCH monitoring or a search space set.

1. Initial Active Uplink Bandwidth Part (BWP)

(1) Default Value and Parameter for Initial Active Uplink BWP

In the NR system, an Initial Active UL (IAU) BWP is defined. To reduce redundant indications for an IAU BWP configuration, two configuration methods: implicit and explicit configuration methods can be considered.

Specifically, default values and detail parameters should be defined for the IAU BWP configuration. The BWP configuration may include the bandwidth of the BWP, the location of the BWP, the subcarrier spacing of the BWP, and a Cyclic Prefix (CP) size.

However, since the numerology of the IAU BWP is identical to that of an Msg3 PUSCH, which is configured by Remaining Minimum System Information (RMSI), only a normal CP is used in the IAU BWP. Thus, the IAU BWP configuration can include only the bandwidth of the BSP, the location of the BWP, and the subcarrier spacing of the BWP.

Meanwhile, the default values of the IAU BWP can be defined as follows.

The bandwidth of the IAU BWP is equal to that of an Initial Active Downlink BWP (IAD BWP).

In a paired spectrum, the location of the IAU BWP is equal to the reference location of an uplink carrier.

The bandwidth of the IAU BWP is equal to that of the IAD BWP.

The numerology of the IAU BWP is equal to that of the IAD BWP.

(2) PRACH Resource Assignment

Transmission of a PUSCH for Msg3 and transmission of a PUCCH for Msg4 HARQ feedback is performed in the IAU BWP.

However, it needs to be discussed whether all FDM-based PRACH occasions configured by RMSI should be included in the IAU BWP.

If an FDMed PRACH occasion can be allocated out of the bandwidth of the IAU BWP, it may improve PRACH transmission performance. On the other hand, if all FDMed RACH occasions are allocated within the IAU BWP, it may prevent a UE from re-adjusting a radio frequency unnecessarily. However, if the PRACH occasion is allocated within UE minimum bandwidth (BW), the UE may transmit a PRACH preamble without re-adjusting the RF. In addition, in the case of a UE capable of supporting wide bandwidth, if the PRACH occasion is allocated within the UE minimum BW, it has an advantage in that transmission loads of the PRACH preamble are distributed. Thus, it is allowed that the FDMed PRACH occasion is allocated out of the bandwidth of the IAU BWP.

2. PRACH Resource Allocation within Slot

(1) Preamble Format A0/A1/A2/A3 within Slot

If preamble format A/B is configured, the last PRACH resource in a PRACH slot uses format B and other PRACH resources in the PRACH slot use format A.

In addition to this configuration, a case in which only format A is used in the PRACH slot can be considered because format A provides wider coverage than format B. In addition, in FDD, a PRACH preamble may be mapped from the first OFDM symbol in the PRACH slot, and at least one OFDM symbol of the last two OFDM symbols in the PRACH slot may be used as a guard OFDM symbol. Thus, in the NR system, only format A can be supported within the PRACH slot, and a gNB can configure the PRACH preamble with format A.

(2) Consecutive Resource Allocation

In the case of a short-sequence-based PRACH preamble, multiple RACH resources may be present in a slot. In this case, PRACH resources may be allocated consecutively or non-consecutively. The non-consecutive PRACH resource allocation has advantages in terms of flexibility and waiting time reduction, but a network should indicate which symbols are reserved for a PRACH and which symbols are not used for the PRACH.

However, it is desirable that PRACH resources are consecutively allocated in terms of resource efficiency and signaling overhead. Specifically, when PRACH resources are consecutively allocated, the PRACH resources may not completely fill a PRACH slot. However, if a plurality of PRACH resources are reserved for the PRACH slot, the PRACH resources should be consecutively located within the PRACH slot.

3. Derivation of Valid PRACH Slot and Valid PRACH Symbol

Before describing a method of deriving a valid PRACH slot and valid PRACH symbols in detail, how a UE and a BS transmit and receive a PRACH by deriving a valid PRACH slot and valid PRACH symbols will be explained.

Figure 11:
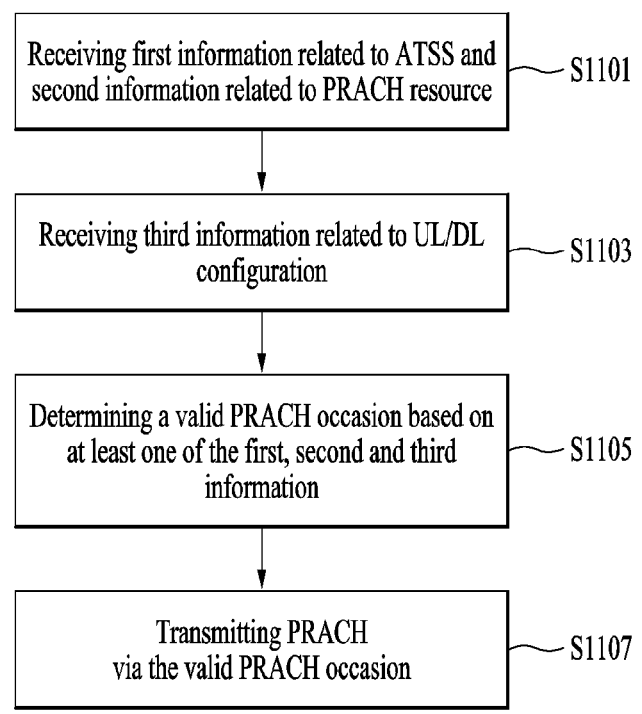
FIGS. 11 to 13 are views illustrating a procedure in which a Physical Random Access Channel (PRACH) is transmitted and received according to an embodiment of the present invention.

FIG. 11 is a diagram for explaining an operation in which a UE transmits a PRACH by deriving a valid PRACH slot and valid PRACH symbols.

Referring to FIG. 11, a UE receives first information related to an Actual Transmitted SSB (ATSS) and second information for a PRACH resource configuration [S1101] and then receives third information related to a UL/DL configuration for determining a slot and usage of symbols included in the corresponding slot during a specific period [S1103]. Thereafter, the UE derives a valid PRACH occasion based on at least one of the first, second, third information, and in this case, the valid PRACH occasion may mean a set of valid PRACH symbols included in the valid PRACH slot [S1105]. The UE transmits the PRACH via the valid PRACH occasion [S1107].

Figure 12:
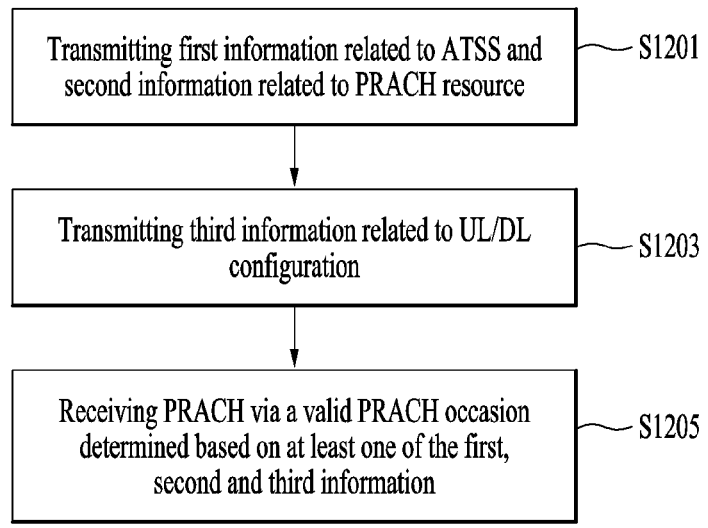
Figure 13:
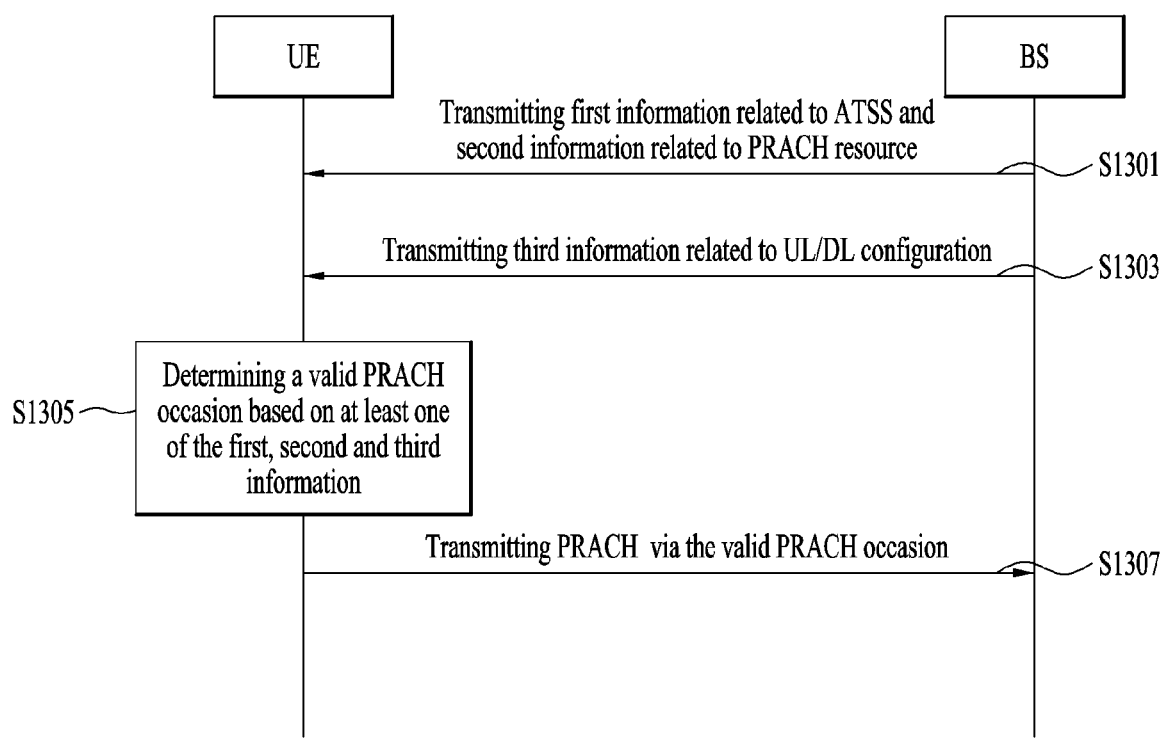

Hereinafter, an operation in which a BS receives a PRACH according to an embodiment of the present invention will be described with reference to FIG. 12. The BS transmits first information related to an ATSS and second information for a PRACH resource configuration [S1201] and then transmits third information related to a UL/DL configuration for determining a slot and usage of symbols included in the corresponding slot during a specific period [S1203]. Thereafter, the BS receives the PRACH via a valid PRACH occasion determined based on at least one of the first, second, and third information [S1205].

The above-described operations will be described again from the perspective of a network. A BS transmits first information related to an ATSS and second information for a PRACH resource configuration [S1301] and then transmits third information related to a UL/DL configuration for determining a slot and usage of symbols included in the corresponding slot during a specific period [S1303]. Thereafter, a UE determines a valid PRACH occasion based on at least one of the first, second, third information [S1305] and then transmits a PRACH based on the determined valid PRACH occasion [S1307].

Hereinafter, a method for determining the valid PRACH occasion based on at least one of the first, second, and third information in each of steps S1105, S1205 and S1305 will be described in detail.

(1) Derivation of Valid PRACH Slot

Similar to the LTE, a PRACH configuration index is defined to indicate a slot pattern within a specific time period during which PRACH resources can be included. The pattern given by the PRACH configuration index is repeated during each PRACH configuration period. In this case, a PRACH configuration period may be set to one of 10, 20, 40 ms. Each state of the PRACH configuration index indicates the density of the PRACH resources and duration during which the PRACH resources are allocated. Meanwhile, unlike the LTE, an uplink dedicated slot may not be necessarily configured due to SSB transmission and dynamic TDD configuration in the NR system.

In addition, even in the PRACH configuration period, a UE cannot transmit any PRACH preambles in duration in which an SSB is transmitted or duration set as a downlink dedicated slot. Thus, in TDD, the UE can derive a valid PRACH slot by combining PRACH configuration information, information on an actually transmitted SSB, and semi-static DL/UL assignment information.

In the NR system, the location of a slot where SSB transmission is possible is defined, but the defined slot is not always reserved for the SSB transmission. Meanwhile, a slot pattern for PRACH resources is determined based on the location of the slot for the SSB transmission. However, considering that the PRACH resources satisfy actually transmitted SSB patterns and different SSB transmission periodicities, it is difficult to fix the slot pattern for the PRACH resources.

The first rule for the slot allocation may be defined as follows: information on an ATSS has priority over a PRACH resource configuration at all times, and second priority is given to information on semi-static DL/UL assignment. In other words, priority is given in the following order: the information on the ATSS, the information on the semi-static DL/UL assignment, and the PRACH resource configuration. Based on the above discussion, slot allocation rules for PRACH resources can be defined as follows.

- Even when a specific slot is defined as PRACH resources by a PRACH configuration, if the corresponding slot is used for SSB transmission according to information on an ATSS included in RMSI or if the corresponding slot is allocated as a downlink dedicated slot according to semi-static DL/UL assignment information included in the RMSI or as an 'unknown' slot, the corresponding slot is not used as the PRACH resources.
- When a specific slot is defined as PRACH resources by a PRACH configuration, if the corresponding slot is not used for SSB transmission because the SSB has a long transmission period, the corresponding slot is used as the PRACH resources. In addition, when a specific slot is defined as PRACH resources by a PRACH configuration and allocated as an uplink dedicated slot, the corresponding slot is used as the PRACH resources.

A UE can derive a valid PRACH slot according to the above-described rules and transmit a PRACH preamble for CBRA and/or CFRA in the derived valid PRACH slot. If an 'unknown' slot or symbol, which is set by semi-static DL/UL assignment, is configured as an uplink slot or symbol by dynamic Slot Format Indication (SFI) or Downlink Control Information (DCI), the UE may transmit a PRACH preamble for CFRA in the corresponding slot or symbol. Meanwhile, the SFI and DCI may be transmitted through UE-specific higher layer signaling.

(2) Derivation of Valid PRACH Symbol

After deriving a valid PRACH slot, a UE can derive valid RACH symbols based on a PRACH preamble format and the start symbol index of a PRACH slot, which are obtained from cell-specific signaling.

First, it will be discussed whether a specific slot can be used as a PRACH slot when the corresponding slot is partially occupied by an SSB although the corresponding slot has a sufficient number of symbols that can be used as a PRACH occasion. In addition, PRACH resources may not be consecutively allocated within the corresponding slot. Thus, if the front portion of the valid PRACH slot is occupied by the SSB and the PRACH resources are consecutively allocated in the rest of the valid PRACH slot, PRACH transmission may be allowed. That is, valid PRACH symbols can be determined among symbols after the symbols occupied by the SSB.

In addition, when a UE derives valid PRACH symbols, the UE may consider semi-static DL/UL assignment information. Specifically, uplink dedicated symbols configured by the semi-static DL/UL assignment information in RMSI may become the valid PRACH symbols. In this case, the valid PRACH symbols should satisfy the number of consecutive symbols, which is required by a PRACH preamble format. In addition, one valid PRACH symbol set may be referred to as one PRACH occasion.

(3) OFDM Symbol Gap after Last SSB Symbol and/or Downlink Portion

As described above, in FR1 and FR2, since uplink and X portions are allocated within a PRACH slot, only a partial PRACH occasion, which is prior to or does not overlap with an SSB, is valid. In other words, the valid PRACH occasion is positioned behind at least N symbols from the last symbol of the SSB and/or a downlink portion. That is, there is a gap composed of the at least N symbols between the valid PRACH occasion and the last symbol of the SSB and/or the downlink portion.

Hereinafter, how many OFDM symbols are required as the gap between uplink and downlink will be described. The gap is determined based on subcarrier spacing of Msg. 1, i.e., a PRACH preamble. For example, when the subcarrier spacing of Msg. 1 is set to 15/30/60 kHz, N=2. When the subcarrier spacing of Msg. 1 is 120 kHz, it is possible to select, as the DL/UL switching gap, an even number of OFDM symbols by considering multiplexing between OFDM symbols with different numerology. Therefore, when the subcarrier spacing of Msg. 1 is 120 kHz, the above equation of N=2 can be satisfied.

Meanwhile, if two OFDM symbols are required as the switching gap, the index of the start OFDM symbol of the PRACH slot should be configured in consideration of the switching gap. For example, referring to FIG. 14(a), when subcarrier spacing is 15 kHz, the last symbol index of the first SSB is 5. Thus, when two OFDM symbols are required as the UL/DL gap, a UE may transmit a PRACH preamble from an OFDM symbol having index 8. Referring FIG. 14(b), it can be seen that in the case of FR2, that is, when subcarrier spacing is 120 kHz, the similar configuration to the 15 kHz subcarrier spacing is applied.

Thus, the start OFDM symbol of the PRACH occasion should be defined to have an even index. In a PRACH configuration table for FR1 and TDD, the index of the start OFDM symbol for formats A1, A2, and A3 can be defined as '8'. In addition, in a PRACH configuration table for FR2 and TDD, the index of the start OFDM symbol for formats A1, A2, A3, and C2 can also be defined as '8'. Moreover, in the PRACH configuration table for FR1 and TDD, the index of the start OFDM symbol for format A2/B2 can be defined as '2'.

4. PRACH Configuration in Unpaired Spectrum and FR1

(1) PRACH Preamble Based on Long Sequence

Currently, the random access configuration for FR1 and an unpaired spectrum is defined as shown in Table 3 below.

TABLE 3

| Format 0, 3 | Format 1 | Format 2 |
|---|---|---|
| x=16, y=1, subframe={{9}} | x=16, y=1, subframe={{7}} | x=16, y=1, subframe={{6}} |
| x=8, y=1, subframe={{9}} | x=8, y=1, subframe={{7}} | x=8, y=1, subframe={{6}} |
| x=4, y=1, subframe={{9}} | x=4, y=1, subframe={{7}} | x=4, y=1, subframe={{6}} |
| x=2, y=0, subframe = {{4}, {9}} | x=2, y=0, subframe = {{7}} | x=2, y=0, subframe = {{6}} |
| x=2, y=1, subframe = {{4}, {9}} | x=2, y=1, subframe = {{7}} | x=2, y=1, subframe = {{6}} |
| x=1, y=0, subframe={{1}, {2}, {3}, {4}, {5}, {6}, {7}, {8}, {9}, {1, 6}, {1, 6}, {2, 7}, {3, 8}, {4, 9}, {8, 9}, {3, 4, 8}, {3, 4, 9}, {4, 8, 9}, {7, 8, 9}, {1, 4, 6, 9}, {3, 4, 8, 9}, {6, 7, 8, 9}, {1, 3, 5, 7, 9}} | x=1, y=0, subframe={{7}} | x=1, y=0, subframe = {{6}} |

Referring to Table 3, it can be seen that a total of 71 (=30+6+6+29) entries are allocated for long-sequence-based PRACH preambles. In addition, it can be seen from Table 3 that some subframes in the front of a DL/UL configuration period may be allocated as downlink and 'unknown' subframes for an SSB transmission region and an RMSI search space in the unpaired spectrum and some subframes in the middle or back thereof may be allocated as a PRACH occasion.

For example, when the DL/UL configuration is 10 ms, the last two subframes (i.e., subframes with indices 8 and 9) in duration of 10 ms may be used as the PRACH occasion. In addition, when the DL/UL configuration is 2 ms, five subframes (subframes with indices 1, 3, 5, 7, and 9) in duration of 10 ms may be used as the PRACH occasion. Thus, it can be seen that in Table 3 corresponding to a PRACH configuration table for long sequences, some entries are not suitable for the DL/UL configuration. Especially, the following entry is not suitable for the DL/UL configuration.

x=1,y=0,subframe={{1}, {2}, {5}, {6}, {7}, {1,6}, {1,6}, {2,7}, {3,8}, {3,4,8}, {1,4,6,9}}

Meanwhile, the PRACH configuration shown in Table 3 can be helpful for avoiding a collision between cells' PRACH occasions. However, in a serving cell, if a gNB transmits an SSB and an RMSI PDCCH/PDSCH in the front portion of a DL/UL configuration period, the collision probability between a downlink channel for transmitting the SSB and RMSI PDCCH/PDSCH and a PRACH occasion may further increase. Consequently, the number of PRACH occasions within the PRACH period may decrease. Thus, at least some entries of Table 3 should be eliminated.

That is, it is desirable that the parameters of format 0 and 3 are modified as follows.

x=1,y=0, subframe={{3}, {4}, {8}, {9}, {4,9}, {3,4}, {8,9}, {3,4,9}, {4,8,9}, {7,8,9}, {3,4,8,9}, {1,3,5,7,9}}

Figure 15:
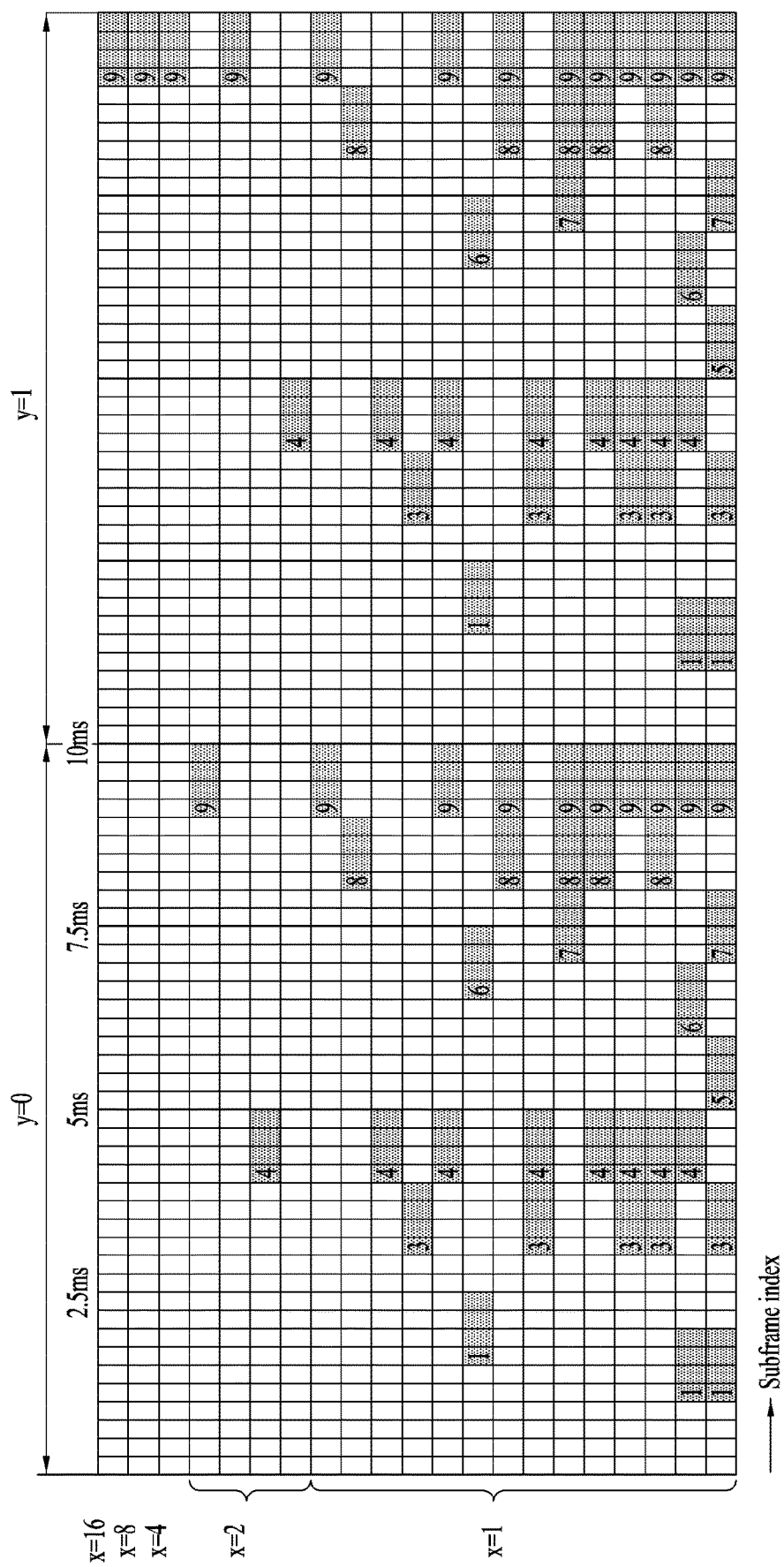
FIG. 15 is a view illustrating an example of configuring a PRACH occasion where a PRACH can be transmitted.

FIG. 15 shows the modification results. In other words, FIG. 15 shows subframe indices and unpaired spectrums for PRACH occasions in FRE Referring to FIG. 15, it can be seen that the modified subframe indices are arranged at the end portions of the DL/UL configuration period, that is, 2 ms, 2.5 ms, 5 ms, and 10 ms.

(2) PRACH Preamble Based on Short Sequence

The configuration for a short-sequence-based PRACH is established to support various periods. However, since there is no entry for long periods in Table 3, the configurations of long periods such as 160 ms, 80 ms and 40 ms are defined for some PRACH preamble formats such as formats A1, A2, A3, B1, B4, C0 and C4.

In addition, although many entries are allocated for the long periods, regarding a period of 20 ms, two entries defined for another format, that is, a slot index set of {2,3,4,7,8,9} and {7,9} are not included as the entries for format A2. To arrange the configurations of the individual formats, more entries can be used as follows.

1) Entries for PRACH preamble formats A2, B4, A1/B1, A2/B2, and A3/B4

Entries for format A2 among entries defined for other formats

TABLE 4

| A2 | 2 | 1 | 2, 3, 4, 7, 8, 9 | 0 | 1 | 3 | 4 |
| A2 | 2 | 1 | 7, 9 | 0 | 1 | 3 | 4 |

Entries for format B4 among entries defined for other formats

TABLE 5

| B4 | 2 | 1 | 9 | 0 | 1 | 1 | 12 |
| B4 | 1 | 0 | 9 | 0 | 1 | 1 | 12 |

Configurations of long periods such as 160 ms, 80 ms and 40 ms and entries for format A1/B1 among entries defined for other formats

TABLE 6

| A1/B1 | 16 | 1 | 9 | 2 | 2 | 6 | 2 |
| A1/B1 | 8 | 1 | 9 | 2 | 2 | 6 | 2 |
| A1/B1 | 4 | 1 | 9 | 2 | 1 | 6 | 2 |
| A1/B1 | 2 | 1 | 2, 3, 4, 7, 8, 9 | 2 | 1 | 6 | 2 |
| A1/B1 | 1 | 0 | 3, 4, 8, 9 | 2 | 1 | 6 | 2 |

Configurations of long periods such as 160 ms, 80 ms and 40 ms and entries for format A2/B2 among entries defined for other formats

TABLE 7

| A2/B2 | 16 | 1 | 9 | 2 | 2 | 3 | 4 |
| A2/B2 | 8 | 1 | 9 | 2 | 2 | 3 | 4 |
| A2/B2 | 4 | 1 | 9 | 2 | 1 | 3 | 4 |
| A2/B2 | 2 | 1 | 2, 3, 4, 7, 8, 9 | 2 | 1 | 3 | 4 |
| A2/B2 | 2 | 1 | 7, 9 | 2 | 1 | 3 | 4 |

Configurations of long periods such as 160 ms, 80 ms and 40 ms and entries for format A3/B3 among entries defined for other formats

TABLE 8

| A3/B3 | 16 | 1 | 9 | 0 | 2 | 2 | 6 |
| A3/B3 | 8 | 1 | 9 | 0 | 2 | 2 | 6 |
| A3/B3 | 4 | 1 | 9 | 0 | 2 | 2 | 6 |
| A3/B3 | 2 | 1 | 2, 3, 4, 7, 8, 9 | 0 | 2 | 2 | 6 |
| A3/B3 | 1 | 0 | 3, 4, 8, 9 | 0 | 1 | 2 | 6 |

5. Super Frame Number (SFN) Information and Subframe Boundary for Target Cell

In the NR, since the shortest PRACH configuration period is 10 ms, a UE should obtain frame boundary information when performing a handover. In a frequency range below 3 GHz, an NR UE can obtain the frame boundary information from a PBCH DMRS sequence. On the contrary, in a frequency range above 3 GHz, a method of informing frequency boundary information for a target cell without PBCH decoding should be defined. In addition, if an association pattern period between PRACH occasions is equal to or longer than 10 ms even though a PRACH entry with a period of 10 ms is configured in the NR system, SFN information of a target cell may be required.

It is assumed that in TDD, a gNB is tightly synchronized within 2.5 ms and the same SFN is applied to a target cell. On the other hand, it is difficult to assume tight synchronization in FDD. Thus, a gNB may provide a UE with SFN information such as an SFN offset between serving and target cells through a handover command.

6. PRACH Resource Association (1) Derivation of Valid PRACH Slot and Valid PRACH Symbol In TDD/FDD, since PRACH resources are mapped in a PRACH slot according to a PRACH configuration regardless of the time location of an ATSS, a UE should be able to derive a valid PRACH slot by combining information included in the PRACH configuration and information on the ATSS transmitted through RMSI. In addition, the locations of candidate slots for SSB transmission are not always reserved for the SSB transmission. That is, as described above, information indicating whether each SSB is actually transmitted is indicated by the RMSI, i.e., the information on the ATSS.

In other words, the UE combines the information on ATSSs, which is transmitted through the RMSI, and the PRACH configuration information and considers predefined rules in order to derive the valid PRACH slot.

In addition, after deriving the valid PRACH slot, the UE should be able to derive valid PRACH symbols based on a signaled PRACH preamble format and the start symbol index of a PRACH slot specified for all cells. When deriving the valid PRACH symbols, the UE should consider Slot Format Indication (SFI) because symbols expressed as uplink symbols by the SFI may be the valid PRACH symbols. Here, the valid PRACH symbols should satisfy the number of consecutive symbols defined in the PRACH preamble format, and one valid PRACH symbol set may be defined as one PRACH occasion.

Moreover, since whether PRACH resources are consecutively allocated within the PRACH slot and whether all PRACH slots has the same number of PRACH occasions should be determined, if the number of PRACH occasions per PRACH slot depends on a cell, the number of PRACH occasions per PRACH slot should be explicitly signaled. Further, a network should signal the number of FDMed PRACH resources using a PRACH-Config index in a two-dimensional time/frequency resource region to allow the UE to calculate the total number of PRACH occasions (2) Rule for Mapping SSB to Valid PRACH Resource or Valid PRACH Occasion After the total number of PRACH occasions that can be allocated in a PRACH configuration period is determined, a method for mapping individual SSBs to the PRACH occasions should also be determined. If the number of PRACH occasions per SSB is 1, that is, if one-to-one mapping is achieved between the SSBs and PRACH occasions, the method of mapping the individual SSBs to the PRACH occasions can be easily determined because the SSBs can be sequentially mapped to the PRACH occasions. Similarly, when there are FDMed PRACH occasions, it is desirable that the SSBs are first mapped to the FDMed PRACH occasions and then mapped to PRACH occasions in the time domain. In this case, the time period of each PRACH occasion needs to be configured according to the PRACH configuration period.

Figure 16:
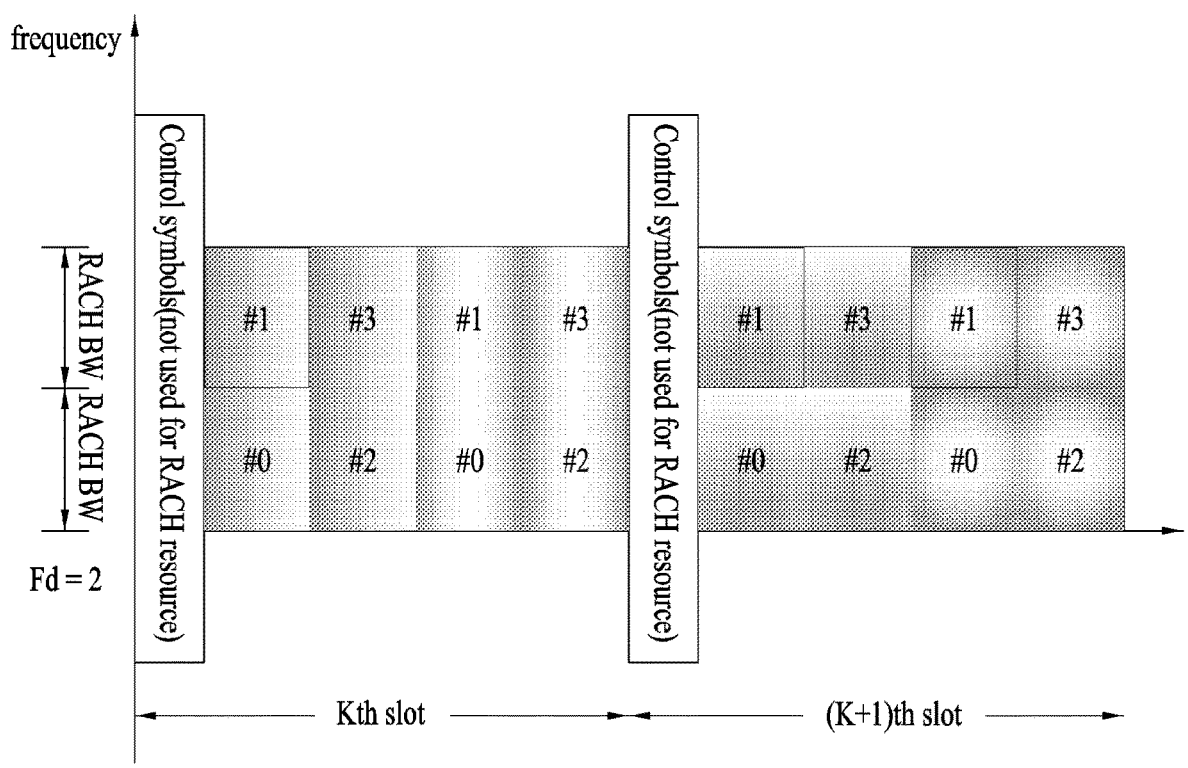
FIGS. 16 and 17 are views illustrating an exemplary method of allocating PRACH occasions.

Meanwhile, FIG. 16 illustrates a case in which a PRACH preamble format has a length of four symbols, a time slot includes four PRACH occasions, and a start symbol index is set 2. Hereinafter, the mapping relationship between SSBs and PRACH occasions will be described with reference to FIG. 16. First, when there are FDMed PRACH occasions, the SSBs may be first mapped in the frequency domain and then mapped in the time domain.

Since a mapping pattern period of PRACH resources is determined based on an ATSS and a mapping rule between SSBs and valid PRACH occasions, the mapping pattern period of the PRACH resources may be different from the PRACH configuration period.

To generalize the mapping rule, parameters can be assumed as follows.

X: the total number of PRACH occasions
$N_{SSB\_per\_RO}$: the number of SSBs per PRACH occasion
$N_{seq\_per\_SSB\_per\_RO}$: the number of CBRA preambles per SSB for a PRACH transmission occasion
M: the number of PRACH occasions per SSB, where M is obtained by $N_{seq\_per\_SSB}/N_{seq\_per\_SSB\_per\_RO}$
Fd: the number of PRACH occasions that can be simultaneously mapped to one SSB 1) When M≥1

When one-to-many mapping is performed, that is, when one SSB is mapped to multiple PRACH occasions, M is an integer greater than 1 (M>1), and Fd=1, M TDMed PRACH occasions may be sequentially mapped to one SSB.

In other words, when the number of SSBs per PRACH occasion, i.e., the value of 1/M is less than 1, the one SSB may be mapped to M PRACH occasions. In this case, the PRACH occasions mapped to the one SSB may be consecutive to each other.

If Fd>1, the M PRACH occasions may be mapped to the SSB in a frequency-first time-second manner Preferably, when M is an integer multiple of Fd, a single SSB may be mapped to FDMed PRACH occasions during a prescribed time period. If multiple SSBs are mapped to one PRACH occasion during the same time period, it should be guaranteed that a network can simultaneously receive beam directions corresponding to the multiple SSBs.

2) When M<1

Now, a case in which multiple SSBs are mapped to one PRACH occasion, that is, many-to-one mapping is performed will be described. If the value of M satisfies 0<M<1 and if 1/M=N where N is the number of SSBs mapped to the one PRACH occasion, the multiple SSBs are CDMed with the one PRACH occasion. In addition, it is assumed that a network can simultaneously receive beam directions corresponding to the multiple SSBs.

If PRACH preamble indices are maximally allocated as if 64 PRACH preamble indices are allocated to a PRACH occasion, PRACH preambles allocated to the individual SSBs may be mapped in a comb-type manner to increase PRACH reception performance on the assumption that a PRACH preamble is received according to a Spatial Division Multiple (SDM) access scheme.

In other words, if two SSBs are mapped to one PRACH occasion, different PRACH preamble indices are mapped to the two SSBs. In this case, a cyclic shift allocated to each SSB is defined as N*Ncs to improve the reception performance of the PRACH preambles.

Meanwhile, when multiple SSBs are associated with one PRACH occasion, preamble indices for CBRA per SSB may be non-consecutively mapped to improve PRACH performance. In addition, although mapping of multiple SSBs to several PRACH occasions can be considered, such a mapping scheme increase implementation complexity, and thus it is desirable to exclude the mapping from mapping types.

(3) PRACH Resource Group Associated with RA-RNTI

A PRACH resource group is defined as PRACH resources or a set of PRACH occasions, and in this case, DCI scheduling a Random Access Response (RAR) in response to a PRACH preamble for each PRACH resource included in the PRACH resource group is masked with the same RA-RNTI.

Therefore, since the same RA-RNTI is used for PRACH preambles, if consecutively TDMed multiple PRACH occasions are associated with the same SSB, RARs in response to PRACH preambles transmitted via the multiple PRACH occasions can be simultaneously transmitted.

Meanwhile, considering the fact that a maximum of 12 PRACH resources can be allocated to each PRACH slot, the RA-RNTI allocation per PRACH slot may be somewhat excessive, and thus it may cause lack of RA-RNTIs.

Thus, if multiple TDMed PRACH resources are associated with the same SSB, the same RA-RNTI should be used for PRACH preambles transmitted on the PRACH resources.

If an RA-RNTI is shared by FDMed PRACH occasions and a single RAR is transmitted for the PRACH occasions, the same rule may be applied to the FDMed PRACH occasions.

The PRACH resource group may be defined as a set of TDMed and/or FDMed PRACH occasions and share the same RA-RNTI. In addition, a maximum of 64 RAPIDs are allocated per PRACH resource group. Moreover, a method of forming the PRACH resource group, i.e., the numbers of TDMed PRACH occasions and FDMed PRACH occasions should be signaled explicitly or implicitly.

Meanwhile, as described above, the PRACH resource group may be determined based on SSB-to-PRACH occasion mapping. When M is more than 1, PRACH occasions multiplexed in the time and/or frequency domain may be a PRACH resource group associated with a single SSB.

In addition, the PRACH resource group may include multiple PRACH occasions associated with multiple SSBs. When M is less than 1, a single PRACH occasion may be a PRACH resource group associated with multiple SSBs. On the other hand, when M is 1, a single PRACH occasion may be a PRACH resource group associated with a single SSB. Here, the maximum number of PRACH preambles per SSB, PRACH occasion, or PRACH resource group may be limited to 64 at all times according to the bit size of an RAPID in the RAR.

(4) Rule for Mapping PRACH Preamble to PRACH Resource

1) The Number of PRACH Preambles Per PRACH Occasion or SSB

Table 9 shows PRACH preambles that a UE should know for mapping thereof to a PRACH occasion and information on supported preamble value ranges. In addition, a UE can calculate the number of PRACH preambles per PRACH occasion based on the number of PRACH preambles for Contention Based Random Access (CBRA) per SSB and the number of PRACH occasions per SSB and signal the number of PRACH occasions per SSB.

occasions mapped per SSB is 4, the number of PRACH preambles per PRACH occasion becomes 12. Meanwhile, if the number of PRACH preambles per SSB is 48 and the number of PRACH occasions mapped per SSB is 5, at least 9 PRACH preambles may be used for each PRACH occasion. And, the remaining 3 PRACH preambles may be sequentially mapped to PRACH occasions mapped per SSB with reference to the PRACH occasion index in a frequency-first time-second manner.

Meanwhile, when M<1, that is, when multiple SSBs are mapped to one PRACH occasion and one same RA-RNTI is shared by the multiple SSBs, the number of PRACH preambles per PRACH occasion is equivalent to a maximum of 64 RAPIDs. If the total number of PRACH preambles for the multiple SSBs is equal to or less than 64, a UE may use the number of PRACH preambles per SSB in the PRACH occasion, which is signaled. However, if the total number of PRACH preambles for the multiple SSBs is more than 64, the UE may recalculate the number of available PRACH preambles such that the number of PRACH preambles per SSB in the PRACH occasion does not exceed 64. For example, assuming that M is ¼ and the number of PRACH preambles per SSB is 16, since the total number of preambles for 4 SSBs does not exceed 64, 16 preambles are used per PRACH occasion. On the other hand, when M is ¼ and the number of PRACH preambles per SSB is 32, the number of PRACH preambles per SSB in the PRACH occasion should be limited to 16.

Further, when M<1, that is, when a plurality of SSBs are mapped to one PRACH occasion, an RA-RNTI may be

TABLE 9

| Parameter | Value | Explanation for current suggestion |
| --- | --- | --- |
| Number of PRACH preambles for CBRA per SSB | {4, 6, 8, 16, 24, 32, 48, 64} | This parameter is explicitly signalled by RMSI |
| Number of PRACH preambles for CBRA and CFRA per SSB | {8, 16, 32, 64} | This parameter is explicitly signalled by RMSI |
| Maximum number of PRACH preambles for CBRA per RACH occasion | {[64]} | This parameter is not explicitly signalled. Instead, the number of SSB associated to a RACH occasion is explicitly or implicitly signalled, which is related to PRACH preamble mapping rule. |
| Maximum number of PRACH preambles for CBRA and CFRA per RACH occasion | {[64], [128 or 256]} | The maximum number of PRACH preamble per RACH occasion should be determined for RAPID size, and [64] could be considered as baseline. The large number (e.g. 128, 256) can be used only for beam recovery or any other purpose (with smaller value of CS and lightly loaded scenario). RACH resource configuration is separately configured for beam recovery, not by RMSI, and this is provided for the purpose of same configuration framework. |

When M≥1, the number of PRACH preambles for CBRA per PRACH occasion is calculated as the number of PRACH preambles, which is obtained by dividing the number of PRACH preambles for CBRA per SSB by M. In this case, if there is a non-zero remainder, the remaining PRACH preambles which are not mapped to PRACH occasions are allocated to an SSB-related PRACH occasion with the maximum or minimum index. Alternatively, the PRACH preambles may be mapped to PRACH occasions in a round robin manner. For example, if the number of PRACH preambles per SSB is 48 and the number of PRACH mapped per SSB at the same time/frequency location. When M is ¼ and the number of PRACH preambles per SSB is 32, 32*4 PRACH preambles can be used in the PRACH occasion with RA-RNTIs specified for the SSBs, and thus a different RAR is generated per SSB in the PRACH occasion. This is related to an RA-RNTI calculation method regardless of whether a (virtual) SSB index is calculated.

2) Method for Mapping SSB and PRACH Occasion to PRACH Preamble Index

The number of PRACH preambles per SSB and the number of PRACH preambles per PRACH occasion are determined based on PRACH preamble index mapping rules. PRACH preamble indices are mapped within a PRACH resource group. Assuming that a single SSB is associated with one PRACH resource group, PRACH preamble indices are mapped to a PRACH occasion(s) associated with the SSB.

In the case of M>1, assuming that the number of PRACH preambles per PRACH occasion is Npreamble_occasion and each PRACH occasion has an index of n (where n=0, 1, . . . , M−1), the nth PRACH occasion has a PRACH preamble index of {0~(Npreamble_occasion−1)+ (n*Npreamble_occasion)}.

On the other hand, in the case of M<1, assuming that SSBs share an RA-RNTI in a PRACH occasion and the number of PRACH preambles calculated per SSB is Npreamble_SSB, a PRACH preamble index of {(0~Npreamble_SSB−1)+(m*Npreamble_SSB)} is allocated to the mth SSB, where m is an SSB index recalculated based on an ATSS. In addition, the PRACH occasion may have PRACH preamble indices for Npreamble_occasion in the range from 0 to Npreamble_occasion, and in this case, Npreamble_occasion may be 64.

Meanwhile, the RA-RNTI may be allocated per SSB, and a PRACH preamble index in the range of {0 to (Npreamble_SSB−1)} may be allocated per SSB. The number of PRACH preambles that can be associated with the PRACH occasion may be m*Npreamble_SSB, where m is the number of SSBs mapped to the PRACH occasion and Npreamble_SSB is the number of PRACH preambles per SSB, which can be obtained from signaling.

3) Method for Mapping PRACH Occasion/SSB to PRACH Preamble

Basically, PRACH preambles are allocated in a direction of increasing the cyclic shift of the root index of a PRACH occasion and the root index. If a PRACH resource group is composed of TDMed PRACH occasions with Fd=1, PRACH preambles may be allocated in a direction of increasing the cyclic shift of the root index of the PRACH resource group, the root index, and a value in the time domain, that is, the PRACH occasion index.

In addition, if a PRACH resource group is composed of TDMed PRACH occasions with Fd>1, PRACH preamble may be allocated in a direction of increasing the cyclic shift of the root index of the PRACH resource group, the root index, and a value in the frequency domain, and a value in the time domain.

If each PRACH resource group has different preamble sequences, PRACH preambles may be generally allocated in a direction of increasing the cyclic shift of a root index, the root index, a value in the frequency domain if Fd>1, and a value in the time domain.

7. Random Access Response (RAR)

RAR transmission is highly correlated to the type of a factor considered in RA-RNTI calculation, and a PRACH resource group may be the basic unit of an RAR. In the LTE, a UE monitors an RAR within an RAR window and attempts to detect a PDCCH masked with an RA-RNTI. In the LTE, the RA-RNTI is calculated as follows: RA-RNTI=1+T_id+ 10*F_id, where T_id is a subframe number and F_id is the frequency location of a RACH resource in TDD system.

Meanwhile, in the NR system, an RA-RNTI should be determined for RAR reception. Although the RA-RNTI can be calculated in a similar manner to the LTE system, since a slot-level resolution, symbol group index, or symbol index should be considered, the T_id calculation method may be further complicated. As an extreme example, if T_id Resolution is at the symbol level, up to 12 RA-RNTIs may be calculated in one slot.

To overcome the above complexity problem, a RACH resource group can be considered. In this case, T_id for the RA-RNTI is determined based on the size of the RACH resource group in the time domain, similar to the function of the slot index and the start symbol index in a slot.

In summary, the RA-RNTI is shared by RACH resources in the RACH resource group. That is, the RA-RNTI is calculated in a similar manner to the LTE system, but in the NR system, T_id has a unique value in each RACH resource group and can be determined by the function of the slot index and the start symbol index in a slot.

Similarly, F_id for the RA-RNTI may include a virtual frequency location and a RACH frequency resource size that can contain the number of FDMed RACH resources (Fd). In addition, as described above, a (virtual) SSB index may be considered when the RA-RNTI is calculated.

8. PRACH Mask Index

A PRACH mask is 4 bits and used for both RRC and a PDCCH. Table 10 below shows PRACH mask indices.

TABLE 10

| PRACH mask Index | Allowed RACH occasion |
| --- | --- |
| 0 | All |
| 1 | RACH occasion index 1 |
| 2 | RACH occasion index 2 |
| 3 | RACH occasion index 3 |
| 4 | RACH occasion index 4 |
| 5 | RACH occasion index 5 |
| 6 | RACH occasion index 6 |
| 7 | RACH occasion index 7 |
| 8 | RACH occasion index 8 |
| 9 | Every even RACH occasion |
| 10 | Every odd RACH occasion |
| 11 | Reserved |
| 12 | Reserved |
| 13 | Reserved |
| 14 | Reserved |
| 15 | Reserved |

It is assumed that in a PRACH occasion group, 3 bits are used to indicate a relative PRACH occasion index corresponding to an indicated SSB index and a specific SSB index is mapped to consecutive PRACH occasions. That is, the number of SSBs per PRACH occasion may be assumed to be 1/N. Meanwhile, 3 bits may be used to indicate one PRACH occasion among 8 logically consecutive PRACH occasions. Based on the above discussion, Table 10 shows three defined states (i.e., all, every even RACH occasion, and every odd RACH occasion states).

Figure 17:
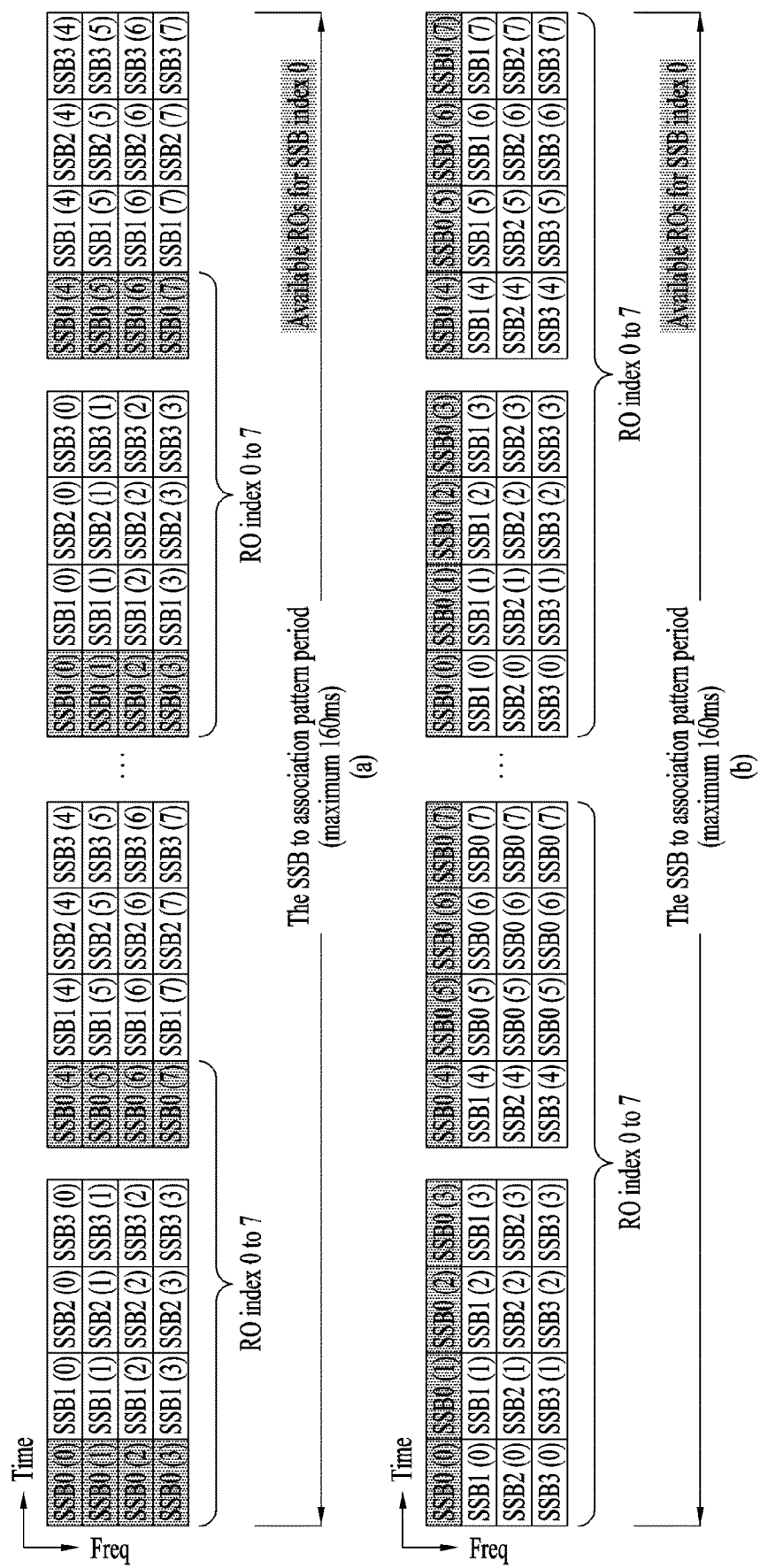

Here, since the definition of the relative PRACH occasion index is unclear, a method of explicitly indexing PRACH occasions is required. FIG. 17 illustrates an example of indexing PRACH occasions corresponding to indicated SSB indices.

Hereinafter, PRACH occasion indexing for the PRACH mask will be described with reference to FIG. 17.

The number of PRACH occasions that can be used for an indicated SSB index is calculated within an association pattern period between SSBs and PRACH occasions (within up to 160 ms).

PRACH occasion indices #0 to #7 are periodically mapped from the first PRACH occasion to the last PRACH occasion.

One PRACH occasion group is composed of 8 logically consecutive PRACH occasions.

An indicated PRACH occasion index is applied to all PRACH occasion groups.

9. CORESET/Search Space for PRACH Procedure (1) Control Resource Set (CORESET) for PRACH Procedure After transmitting a PRACH preamble during a PRACH occasion, a UE monitors an RAR within a configured RAR window. Since the RAR is transmitted on a PDSCH, the UE monitors a PDCCH using an RA-RNTI and may obtain time-frequency information related to transmission of the PDSCH for the RAR from DCI scheduling the RAR. Thus, a network can inform a UE of a CORESET corresponding to the locations of potential symbols and slots for the DCI scheduling the RAR. Specifically, information on the CORESET for the PRACH procedure may be transmitted through a PRACH configuration included in RMSI.

If the CORESET configuration for the PRACH procedure is not configured, the CORESET for RMSI reception is used for the PRACH procedure. In other words, all messages related to PDCCH transmission such as msg. 2/msg.3 retransmission/msg. 4 scheduling share the same CORESET during the PRACH procedure.

(2) Monitoring Window for PRACH Procedure

After transmitting a PRACH preamble, a UE monitors an RAR within a configured window. In addition, due to multi-beam operation, the UE monitors not only DCI for the RAR but also DCI for msg. 3 retransmission/msg. 4 scheduling within the configured window.

Specifically, since windows for individual messages may have different sizes, the size of a window configured for DCI for RAR reception and msg. 3 retransmission may be equal to that of a window configured for DCI for msg. 4 scheduling reception. Meanwhile, the monitoring window for the RAR reception starts from the first 'valid' downlink slot where the minimum timing gap is considered after the UE transmits the PRACH preamble. Similarly, the monitoring window for msg. 3 retransmission/msg. 4 scheduling starts from the first valid downlink slot after the UE transmits msg. 3.

(3) Monitoring Occasions for PRACH Procedure

It is desirable that a UE monitors all slots within a monitoring window to receive a PRACH message. Thus, symbols corresponding to monitoring targets in each slot the UE should monitor, that is, monitoring occasions should be explicitly indicated. Unlike broadcast system information transmitted in association with SSB indices, messages for the PRACH procedure may not be necessarily associated with the SSB indices.

Candidate monitoring occasions for RAR reception allocated within one slot may be informed a UE, or multiple DCI for PRACH messages may be transmitted on monitoring occasions indicated by the individual slots within the monitoring window.

If the number of monitoring rounds for RMSI reception on a PBCH is set to 1 and then indicated, all UEs in the system monitors PDCCH monitoring occasions from the first symbol of each slot during the monitoring window.

If the number of monitoring occasions indicated within one slot is 2, the UE should know the monitoring occasions to be monitored within the slot, that is, the UE should know whether to start monitoring at the first symbol of the slot or the middle of the slot, for example, symbol #2, #3, or #7. Meanwhile, since a monitoring occasion is associated with an SSB index and the SSB index is also associated with RA-RNTI generation, it may be simpler to associate an RA-RNTI value with the monitoring occasion.

For example, if the RA-RNTI value is an even number, the UE may attempt PDCCH detection in monitoring occasions starting at the first symbols of all slots within the monitoring window. If the RA-RNTI value is an odd number, the UE attempt the PDCCH detection in monitoring occasions located at the middle of all sots within the monitoring window.

Figure 18:
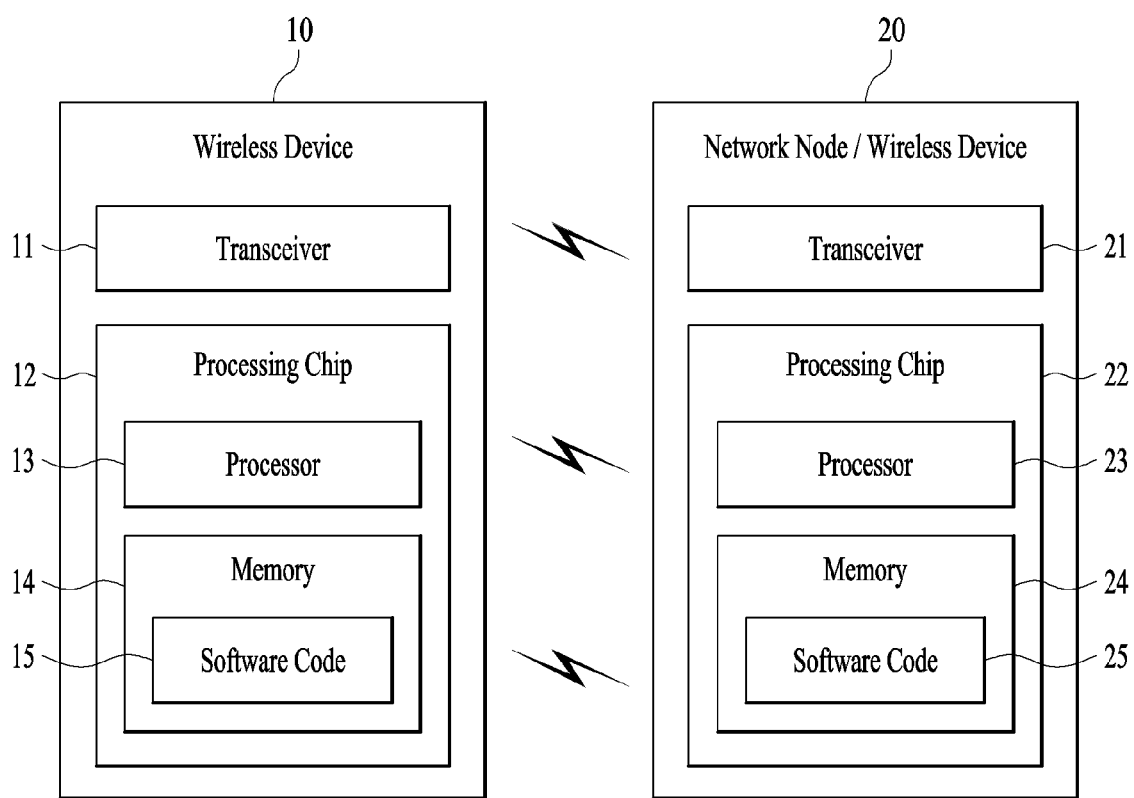
FIG. 18 is a block diagram illustrating components of a wireless device that implements the present invention.

FIG. 18 is a block diagram illustrating an example of communication between a wireless device 10 and a network node 20. Here, the network node 20 may be replaced with the wireless device of FIG. 18 or a UE.

In this specification, the wireless device 10 or the network node 20 includes a transceiver 11, 21 for communicating with one or more other wireless devices, network nodes, and/or other elements of the network. The transceivers 11 and 21 may include one or more transmitters, one or more receivers, and/or one or more communication interfaces.

In addition, the transceivers 11 and 21 may include one or more antennas. The antennas function to transmit signals processed by the transceivers 11 and 21 to the outside under control of the processing chips 12 and 22 or to receive wireless signals from the outside and transmit the signals to the processing chips 12 and 22, according to an embodiment of the present invention. The antennas are also referred to as antenna ports. Each antenna may correspond to one physical antenna or be configured by a combination of more than one physical antenna element. The signal transmitted from each antenna may not be further divided by the wireless device 10 or the network node 20. A reference signal (RS) transmitted for the corresponding antenna defines the antenna from the perspective of the wireless device 10 or the network node 20 and enables the wireless device 10 or the network node 20 to perform channel estimation for the antenna regardless of whether the channel is a single wireless channel from one physical antenna or a composite channel from a plurality of physical antenna elements including the antenna. That is, an antenna is defined such that a channel for delivering a symbol on the antenna may be derived from the channel through which another symbol on the same antenna is transmitted. A transceiver supporting a multi-input multi-output (MIMO) function to transmit and receive data using a plurality of antennas may be connected to two or more antennas.

In the present invention, the transceivers 11 and 21 may support reception beamforming and transmission beamforming. For example, in the present invention, the transceivers 11 and 21 may be configured to perform the functions illustrated in FIGS. 8 to 10.

In addition, the wireless device 10 or the network node 20 includes a processing chip 12, 22. The processing chips 12 and 22 may include at least one processor, such as a processor 13, 23, and at least one memory device, such as a memory 14, 24.

The processing chips 12 and 22 may control at least one of the methods and/or processes described herein. In other words, the processing chips 12 and 22 may be configured to implement at least one of the embodiments described herein.

The processors 13 and 23 include at least one processor for performing the function of the wireless device 10 or the network node 20 described herein.

For example, one or more processors may control the one or more transceivers 11 and 21 of FIG. 18 to transmit and receive information.

The processors 13 and 23 included in the processing chips 12 and 22 perform predetermined coding and modulation on signals and/or data to be transmitted to the outside of the wireless device 10 or the network node 20, and then transmit the signals and/or data to the transceivers 11 and 21. For example, the processors 13 and 23 convert a data sequence to be transmitted into K layers through demultiplexing, channel coding, scrambling, and modulation processes. The coded data sequence is also referred to as a code word and is equivalent to a transport block, which is a data block provided by the MAC layer. One transport block (TB) is coded into one code word, and each code word is transmitted to a reception device in the form of one or more layers. To perform frequency up-conversion, the transceivers 11 and 21 may include an oscillator. The transceivers 11 and 21 may include $N_t$ transmit antennas (where $N_t$ is a positive integer greater than or equal to 1).

In addition, the processing chips 12 and 22 include a memory 14, 24 configured to store data, programmable software code, and/or other information for implementing the embodiments described herein.

In other words, in the embodiments according to the present invention, when the memories 14 and 24 are executed by at least one processor, such as the processors 13 and 23, the memories allow the processors 13 and 23 to execute some or all of the processes controlled by the processors 13 and 23 of FIG. 18, or store software codes 15 and 25 including instructions for implementing the embodiments described herein based on FIGS. 1 to 17.

Specifically, the processing chip 12 of the wireless device 10 according to an embodiment of the present invention is configured to receive first information related to an Actual Transmitted SSB (ATSS), second information for configuring PRACH resources, and third information related to a UL/DL configuration for determining a slot and usage of symbols included in the corresponding slot during a specific period. Thereafter, the processing chip 12 is configured to derive a valid PRACH occasion based on at least one of the first, second, third information. In this case, the valid PRACH occasion may mean a set of valid PRACH symbols included in a valid PRACH slot. The valid PRACH occasion can be derived according to the embodiments described in the present specification. The processing chip 12 is configured to transmit a PRACH via the valid PRACH occasion.

In addition, the processing chip 22 of the network node 20 according to an embodiment of the present invention is configured to transmit first information related to an Actual Transmitted SSB (ATSS) and second information for configuring PRACH resources. Thereafter, the processing chip 22 is configured to transmit third information related to a UL/DL configuration for determining a slot and usage of symbols included in the corresponding slot during a specific period. Moreover, the processing chip 22 is configured to receive a PRACH via a valid PRACH occasion that is determined based on at least one of the first, second, third information. Meanwhile, the valid PRACH occasion can be determined according to the embodiments described in the present specification.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The method of transmitting and receiving a physical random access channel and device therefor are described based on the 5G New RAT system, the method and device can be applied to various wireless communication systems as well as the 5G New RAT system.

What is claimed is:
1. A method of transmitting a Physical Random Access Channel (PRACH) by a user equipment (UE) in a wireless communication system, the method comprising:
receiving first information related to at least one Synchronization Signal Block (SSB) transmitted to the UE and second information related to PRACH resources;
obtaining a PRACH slot including a plurality of PRACH resources based on the second information;
obtaining at least one valid PRACH resource in which the at least one SSB can be mapped, among the plurality of PRACH resources based on the first and second information; and
transmitting the PRACH on a valid PRACH resource among the at least one valid PRACH resource,
wherein the at least one valid PRACH resource is at least one PRACH resource allocated after symbols in which a last SSB of the at least one SSB is received, among the plurality of PRACH resources included in the PRACH slot.

2. The method of claim 1, wherein the at least one valid PRACH resource is at least one PRACH resource not allocated as a downlink resource by an Uplink/Downlink (UL/DL) configuration among the plurality of PRACH resources.

3. The method of claim 2, wherein a PRACH resource allocated as an uplink resource by the UL/DL configuration among the plurality of PRACH resources is included in the at least one valid PRACH resource.

4. The method of claim 1, wherein the at least one valid PRACH resource is at least one PRACH resource allocated after a gap based on subcarrier spacing for the PRACH resource from the symbols where the last SSB is received.

5. The method of claim 4, wherein when the subcarrier spacing is 120 kHz, the gap is composed of two symbols.

6. An apparatus for transmitting a Physical Random Access Channel (PRACH) in a wireless communication system, the apparatus comprising:
   at least one processor; and
   at least one computer memory operably connectable to the at least one processor and storing instructions that, when executed by the at least one processor, perform operations comprising:
   receiving first information related to at least one Synchronization Signal Block (SSB) transmitted to the apparatus and second information related to PRACH resources;
   obtaining a PRACH slot including a plurality of PRACH resources based on the second information;
   obtaining at least one valid PRACH resource in which the at least one SSB can be mapped, among the plurality of PRACH resources based on the first and second information; and
   transmitting the PRACH on a valid PRACH resource among the at least one valid PRACH resource,
   wherein the at least one valid PRACH resource is at least one PRACH resource allocated after symbols in which a last SSB of the at least one SSB is received, among the plurality of PRACH resources included in the PRACH slot.

7. The apparatus of claim 6, wherein the at least one valid PRACH resource is at least one PRACH resource not allocated as a downlink resource by an Uplink/Downlink (UL/DL) configuration among the plurality of PRACH resources.

8. The apparatus of claim 7, wherein a PRACH resource allocated as an uplink resource by the UL/DL configuration among the plurality of PRACH resources is included in the at least one valid PRACH resource.

9. The apparatus of claim 6, wherein the at least one valid PRACH resource is at least one PRACH resource allocated after a gap based on subcarrier spacing for the PRACH resource from the symbols where the last SSB is received.

10. The communication device apparatus of claim 9, wherein when the subcarrier spacing is 120 kHz, the gap is composed of two symbols.

11. A method of receiving a Physical Random Access Channel (PRACH) by a base station (BS) in a wireless communication system, the method comprising:
   transmitting first information related to at least one Synchronization Signal Block (SSB) transmitted to a user equipment (UE) and second information related to PRACH resources;
   obtaining a PRACH slot including a plurality of PRACH resources based on the second information;
   obtaining at least one valid PRACH resource in which the at least one SSB can be mapped, among the plurality of PRACH resources based on the first and second information; and
   receiving the PRACH on a valid PRACH resource among the at least one valid PRACH resource,
   wherein the at least one valid PRACH resource is at least one PRACH resource allocated after symbols in which a last SSB of the at least one SSB is received among the plurality of PRACH resources included in the PRACH slot.

* * * * *